(12) United States Patent
Chittu et al.

(10) Patent No.: US 7,181,684 B2
(45) Date of Patent: Feb. 20, 2007

(54) DYNAMIC TREE CONTROL SYSTEM

(75) Inventors: Jeyaprakash K. Chittu, Burlington, MA (US); Anil Tandon, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 826 days.

(21) Appl. No.: 09/735,356

(22) Filed: Dec. 12, 2000

(65) Prior Publication Data

US 2002/0107892 A1 Aug. 8, 2002

(51) Int. Cl.
G06F 15/00 (2006.01)
(52) U.S. Cl. ................... 715/514; 715/513; 715/517
(58) Field of Classification Search ........... 715/513, 715/514, 517
See application file for complete search history.

(56) References Cited

U.S. PATENT DOCUMENTS

| 5,895,474 | A | * | 4/1999 | Maarek et al. ............... 715/514 |
| 6,023,715 | A | * | 2/2000 | Burkes et al. ............... 715/514 |
| 6,460,033 | B1 | * | 10/2002 | Perttunen ........................ 707/4 |
| 6,496,842 | B1 | * | 12/2002 | Lyness ........................ 715/514 |
| 6,826,727 | B1 | * | 11/2004 | Mohr et al. .................. 715/517 |
| 6,910,182 | B2 | * | 6/2005 | Huang ......................... 715/514 |
| 2001/0045952 | A1 | * | 11/2001 | Tenev et al. ................. 345/440 |
| 2004/0133848 | A1 | * | 7/2004 | Hunt et al. .................. 715/500 |
| 2004/0187080 | A1 | * | 9/2004 | Brooke et al. ............... 715/522 |
| 2005/0022129 | A1 | * | 1/2005 | Borenstein et al. .......... 715/734 |

OTHER PUBLICATIONS

"Dynamic Tree View in a Browser-Based Environment", IBM Technical Disclosure Bulletin, Dec. 1999, UK, NNRD428115.*

Goodman, D., "Dynamic HTML The Definitive Reference", Chapter 1—The State of the Art, (CA: O'Reilly & Associates, Inc.), pp. 3-13 (Jul. 1998).

Information regarding scripting language, "JavaScript Developer Central," pp. 1-3, http://developer.netscape.com/tech/javascript/javascript.html (Downloaded May 22, 2001).

Home page of "MSDN Online Web Workshop", 1 page, http://msdn.microsoft.com/workshop/author/default.asp, (Downloaded May 22, 2001).

Information on Dynamic HTML Developer Central, "Navigator 4 Dynamic HTML Developer Central," pp. 1-4, http://developer.netscape.com/tech/dynhtml/dynhtml.html, (Downloaded May 22, 2001).

(Continued)

*Primary Examiner*—Heather R. Herndon
*Assistant Examiner*—R. Singh
(74) *Attorney, Agent, or Firm*—Chapin IP Law, LLC; Barry W. Chapin, Esq.

(57) ABSTRACT

A dynamic tree control system includes a scripted program sent from a server, to be interpreted by a client browser. The program uses dynamic HTML and includes program code for displaying, under the control of the browser, a tree structure having one or more tree nodes in which at least a portion of data retrieved from the server is represented. The program also includes program code for dynamically altering, in response to some event, the tree structure without further accessing the server. The program also includes an event manager that registers with the browser to be notified upon the occurrence one or more events. The event manager receives notification of the event from the browser, and notifies the layer in which the event originated or took place. A notified layer response to the event, for example, by dynamically altering the tree structure.

46 Claims, 24 Drawing Sheets

OTHER PUBLICATIONS

"Document Object Model (DOM) Level 2 Traversal and Range Specification," Version 1.0, W3C® Recommendation Nov. 13, 2000, pp. 1-78 (2000), http://www.w3.org/TR/2000/REC-DOM-Level-2-Traversal-Range-20001113.

"Document Object Model (DOM) Level 3 Style Specification," Version 1.0, W3C® Recommendation Nov. 13, 2000, pp. 1-132 (2000), http://www.w3.org/TR/2000/REC-DOM-Level-2-Style-20001113.

"Document Object Model (DOM) Level 2 Events Specification," Version 1.0, W3C® Recommendation Nov. 13, 2000, pp. 1-50 (2000), http://www.w3.org/TR/2000/REC-DOM-Level-2-Events-20001113.

"Document Object Model (DOM) Level 2 Views Specification," Version 1.0, W3C® Recommendation Nov. 13, 2000, pp. 1-21 (2000), http://www.w3.org/TR/2000/REC-DOM-Level-2-Views-20001113.

"Document Object Model (DOM) Level 2 Core Specification," Version 1.0, W3C® Recommendation Nov. 13, 2000, pp. 1-107 (2000), http://www.w3.org/TR/2000/REC-DOM-Level-2-Core-20001113.

"Document Object Model (DOM) Level 1 Specification (Second Edition)," Version 1.0, W3C® Working Draft Sep. 29, 2000, pp. 1-212 (2000), http://www.w3.org/TR/2000/WD-DOM-Level-1-2000929.

"Cascading Style Sheets, level 2 CSS2 Specification," W3C® Recommendation May 12, 1998, pp. 1-338, http://www.w3.org/TR/1998/REC-CSS2-19980512.

"Using the TreeView Control," pp. 1-4, http://msdn.microsoft.com/library/devprods/vs6/vbasic/vbcon98/vbconusingtreeviewcontrol. (Downloaded May 21, 2001).

"Cascading Style Sheets, level 1," W3C® Recommendation Dec. 17, 1996, revised Jan. 11, 1999, pp. 1-70, http://www.w3.org/TR/1999/REC-CSS1-19990111. (Downloaded May 22, 2001).

"Cascading Style Sheets, home page," W3C® Core Styles, pp. 1-13, http://www.w3.org/Style/CSS/, (Downloaded May 22, 2001).

"Document Object Model (DOM)", W3C® DOM WG, pp. 1-3, http://www.w3.org/DOM/, (Downloaded May 22, 2001).

Information on dynamic HTML overview on "MSDN Online Web Workshop, Dynamic HTML Overview", pp. 1-2, http://msdn.microsoft.com/workshop/author/dhtml/dhtmlovw.asp, (Downloaded May 22, 2001).

"HTML 4.01 Specification," W3C® Recommendation Dec. 24, 1999, Chapters 1-24, http://www.w3.org/TR/1999/REC-html1401-19991224 (Downloaded May 23, 2001).

"Client-Side JavaScript Guide," Version 1.3, (CA: Netscape Communications Corporation), pp. 1-309 (1999).

"Client-Side JavaScript Reference," Version 1.3 (CA: Netscape Communications Corporation), pp. 1-697 (1999).

"Inheritance of Block-Level Formatting Properties," Dynamic HTML, Communicator 4.0, Aug. 1997, pp. 41-82.

"Understanding the Event Model," http://msdn.microsoft.com/workshop/author/om/event_model.asp pp. 1-11.

"Cascading Style Sheet in Internet Explorer 4.0," http://msdn.microsoft.com/workshop/author/css/css-ie4.asp pp. 1-19.

* cited by examiner

```
<SCRIPT LANGUAGE=javascript>
<1--
        //Create Event Manager to handle user click events
52 —— var em = new EventManager ();
        //Create a component manager to manager all the component we are
        //creating on the screen
54 —— var cm = new ComponentManger ();

//Create a tree control and set its dimension
56 —— var t = new Tree ();
        t.setName ('t1');
        t.setDimensions (100, 100, 200, 200);
   58   t.setReference ('document');
        t.setBackgroundColor ('white');
        t.setNodeIcons ('open', 'czfldopn.gif', 'closed', 'czfldcls.gif');
        var rt = t.addNode (null, null, 'rt', 'Root');
        var n1 = t.addNode (rt, Tree.AT_CHILD, 'n1', 'Node 1');
        var n2 = t.addNode (n1, Tree.AT_LAST, 'n2', 'Node 2');
        var n3 = t.addNode (n2, Tree.AT_CHILD, 'n3', 'Node 3');
   60   var n4 = t.addNode (n1, Tree.AT_CHILD, 'n4', 'Node 4');
        var n5 = t.addNode (n4, Tree.AT_CHILD, 'n5', 'Node 5 with a lengthy name');
        var n6 = t.addNode (n5, Tree.AT_CHILD, 'n6', 'Node 6');
        var n7 = t.addNode (rt, Tree.AT_CHILD, 'n7', 'Node 7');

//add the tree control to component manager
62 ——    cm.addComponent(t);
         //generate CSS style sheets
64 ——    cm.generateCSS();

function init () {
           //Hookup event manager with controls that are rendered to listen
           //for user events
           cm.launchComponents (em);
66         //Initiate event manager to start to listen for user events
           em.init ();
        }
//-->
</SCRIPT>
```

```
<SCRIPT TYPE="text/css">
#tl{position:absolute; left:100; top:100; width:263; height:206;
layer-background-color:white; background-color:white; clip:rect(0, 263, 206, 0);
z-index:0; visibility:inherit;} }
#rt{position:absolute; left:0; top:0; width:200; height:22;
layer-background-color:white; background-color:white; clip:rect(0, 200, 22, 0);
z-index:2; visibility:inherit; }
#rtLbl{position:absolute; left:19; top:0; width:20; height:22;
layer-background-color:white; background-color:white; visibility:inherit; }
#rtIcon{position:absolute; left:0; top:0; width:16; height:22;
layer-background-color:white; background-color:white; clip:rect(0 16, 22, 0);
visibility:inherit; }

...

#n7{position:absolute; left:0; top:154; width:200; height:22;
layer-background-color:white; background-color:white; clip:rect(0 200, 22, 0);
z-index:2; visibility:inherit; }
#n7Lbl{position:absolute; left:37; top:0;.width:20; height:22;
layer-background-color:white; background-color:white; visibility:inherit; }
#n7Icon{position:absolute; left:16; top:0; width:16; height:22;
layer-background-color:white; background-color:white; clip:rect(0 16, 22, 0);
visibility:inherit; }
#n7tvLine{position:absolute; left:7; top:11; width:1; height:143;
layer-background-color:#003D84; background-color:#003D84; clip:rect(0, 1, 143, 0);
z-index:1; visibility:inherit; }
#n7ClpSr{position:absolute; left:0; top:0; width:16; height:22;
layer-background-color:white; background-color:white; clip:rect(0, 16, 22, 0);
visibility:inherit; }
</STYLE>
```

70

72 { (first two rules)

74 { (next two rules)

FIG. 6B

```
<SCRIPT LANGUAGE=javascript>
cm.renderComponents();
</SCRIPT>
```
— 80

FIG. 6C

```
<DIV ID=t1>
<DIV ID=rt>
<DIV ID=rtIcon><IMG ID=IMG-rtIcon NAME=IMG-rtIcon SRC="oa_media/czfldcls.gif"
></IMG></DIV
><DIV ID="rtLbl"><NOBR ID="SPN-rtLbl">Root</NOBR></DIV>
</DIV>
 :
<DIV ID=n7>
<DIV ID=n7Clpsr><IMG ID=IMG-n7Clpsr NAME=IMG-n7Clpsr SRC="oa_media/czLNode.gif"
HEIGHT=22 WIDTH=16 ></IMG></DIV>
<DIV ID=n7Icon><IMG ID=IMG-n7Icon NAME=IMG-n7Icon SRC="oa_media/czfldcls.gif"
></IMG></DIV>
<DIV ID=n7LBL><NOBR ID="SPN-n7Lbl">Node 7</NOBR></DIV>
</DIV>
<DIV ID=n7tvLine></DIV>
</DIV>
```
92 ⌒                                                                                              90

FIG. 6D

DYNAMIC TREE CONTROL SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computer applications make use of tree controls. For example, when commanded to open a file, an application will often display a tree control representing the file directory structure, wherein the nodes of the tree represent either files or subdirectories which may themselves contain files and/or additional subdirectories.

Typically, to save space, only one or two directory levels are shown. Further sub-levels are represented by a "collapser," typically a small box enclosing a "+" or a "–" sign, which when clicked on by a user, either expands the node to display another sublevel, or collapses the node to hide the node's sublevels.

Such tree controls can be used to display any data of a hierarchical nature.

The World Wide Web, together with the Internet, allows a client browser to retrieve information from a Web server. Typically, such data is retrieved in the form of a Web page formatted at least in part in Hypertext Markup Language, or HTML. In many cases, it is desirable to display the retrieved hierarchical data in a tree control structure.

An application showing data in a tree-like form in an Internet browser typically relies on either tree controls built with Java Applet or Microsoft Active X. Java is a different language that requires a Java "virtual machine" and should not be confused with JavaScript. A Java applet, which is a relatively "small" application written in Java, requires binary code to be downloaded from a server. The final outcome depends on the Java virtual machine available on the browser. If none is available, the user must download a Java "plug-in." In Microsoft's Active X control solution, for example, a user must download and install the Active X control. These two solutions do not work if the user cannot or chooses not to download and install the virtual machine or plug-in.

SUMMARY

While hierarchical data is often retrieved from a Web server and can be displayed in a tree control structure, updating the tree can be tedious because typically, after a user action which should cause a change to the tree (such as clicking on a node's collapser, or adding or removing a node), the browser reports the user's action to the server in the form of a new request. The server then updates the tree structure and returns a new page with the updated structure. Such a transaction can take seconds or even tens of seconds, an annoyingly long time—especially when performed repeatedly.

Using pure HTML, absolute and dynamic positioning of contents in a Web page is virtually impossible. With the Cascading Style Sheets (CSS) standard, developed by the World Wide Web Consortium (W3), absolute positioning of contents as "layers" can be achieved.

Scripts written in JavaScript, or other scripting languages, can be included within the <SCRIPT> and </SCRIPT> tags of an HTML document. When encountered by the browser, a script is interpreted by the browser.

The Cascading Style Sheet (CSS) standard was developed to solve the problem of absolute positioning of contents. With style sheets, the contents of a page can be positioned anywhere on the screen.

The Document Object Model (DOM) standard is an emerging standard that, along with some language such as JavaScript, enables dynamic content management. DOM, through bindings for various languages such as JavaScript, provides access to the various parts of the document object to a script.

The CSS and DOM standards are available from the World Wide Web Consortium. A good reference for these technologies, as well as HTML and Javascript, is Danny Goodman, "Dynamic HTML," O'Reilly & Associates, Inc. 1998.

When combined with a scripting language such as Javascript, and utilizing the Document Object Model (DOM) defined by W3, which allows a script written in Javascript to access the layers of the Web page, dynamic positioning of the layers can be achieved.

HTML, CSS, DOM and Javascript together make up what is commonly called Dynamic HTML, or DHTML.

Applet-based dynamic tree controls have been implemented with the Java programming language, which is different from and should not be confused with JavaScript. Alternatively, dynamic tree controls may be developed using Microsoft Active X. Both of these solutions, Java and Active X, present problems.

First, current browsers do not naturally support Java or Active X. Java, for example, runs on a "virtual machine," which must be enabled on the browser. For various reasons, the user may be unable or unwilling to enable the virtual machine.

Second, if the client system has a firewall installed to keep out computer viruses and other potentially dangerous executable files, the client system may not be able to load applets.

Third, because Java applets are compiled into a virtual machine binary, they can be extremely large, requiring a large amount of time to download.

On the other hand, the most common browsers, Netscape Navigator and Microsoft Internet Explorer, both support Javascript. Javascript scripts are interpreted by the browser, which provides a natural protection against viruses. Since the scripts are delivered in normal ASCII characters through HTTP rather than as a binary file, they are not blocked by the firewall. Finally, because the scripts are in ASCII, they can be greatly compressed, significantly decreasing their download time.

The dynamic tree control of the present invention can solve the prior art problems because JavaScript source code comprises ASCII text. That is, it is made up of standard characters, which are interpreted by the browser, obviating the need for a separate virtual machine.

Because the architecture of the dynamic tree control is based on simple standard technologies that are all supported by the browser, the control can have the same look and feel across all browsers and on all platforms.

Embodiments of the present invention can allow a server to provide customized problem-free, compilation-free and easily deployable tree controls for Internet applications.

Accordingly, a dynamic tree control system includes a scripted program sent from a server, to be interpreted by a client browser. The program uses dynamic HTML and includes program code for displaying, under the control of the browser, a tree structure having one or more tree nodes in which at least a portion of data retrieved from the server is represented. The program also includes program code for dynamically altering, in response to some event, the tree structure without further accessing the server. The server can be, but is not limited to, a Web server, a file server, or even an operating system which provides files to the browser.

In a further embodiment, the scripted program also includes an event manager that registers with the browser to be notified upon the occurrence of one or more events. The event manager receives notification of the event from the browser, and notifies the layer in which the event originated or took place. A notified layer responds to the event, for example, by dynamically altering the tree structure.

In yet a further embodiment, the scripted program further includes a listener that registers one or more layers that wish to listen for a specified event, receives notification of an event, and notifies layers which have registered for the event that the event has occurred.

In one embodiment, the program code for altering the tree structure comprises program code that adds or deletes at least one new tree node, or modifies the data with which the node is associated. Alternatively, the program code can modify the appearance of the node itself.

In one embodiment, a node contains any or all of, but is not limited to, an icon, a collapser and a label. For example, the icon can be one of several folder icons, where each folder icon represents a node status. Thus, the program code for altering the tree structure can include program code that expands a collapsed node when the node's collapser is clicked by a user, code that collapses an expanded node when the node's collapser is clicked by the user, and code that alternates a collapser's state responsive to the collapsed/expanded state of the collapser's corresponding node.

In one embodiment, the dynamic tree control system script is written in Javascript. The scripted program and the data are sent by the server using HTTP and HTML.

The dynamic tree control system can include tree class program code for representing the tree in a tree structure and for displaying the tree in a tree layer responsive to the tree structure. The system also includes tree node class program code for representing one or more tree nodes in corresponding tree node structures and displaying the tree nodes in respective tree node layers. The tree structure refers to the tree node structures, where the corresponding tree layer contains tree node layers. At least one tree node structure is associated with data retrieved from the server.

In one embodiment, a tree node layer includes a collapser layer, an icon layer and a label layer.

At least one embodiment of the present invention includes program code for generating a style sheet for a layer, responsive to the layer's depth within the tree structure.

At least one embodiment of the present invention includes program code for rendering <DIV> tags, responsive to the tree structure.

In at least one embodiment, additional data is retrieved from the server upon a specified event.

The dynamic tree control system can be used, for example, to represent a bill of material, or an organization structure.

In another aspect of the present invention, a set of classes for implementing a browser-independent control on a Web page, includes an image button class and a prompt class. The image button and prompt classes are implemented in a script which is interpreted by a browser, and which uses a document object model to allow image button and prompt class instances to access their corresponding image buttons and prompts in the Web page.

In a further embodiment, the control is a tree control, and the set of classes further includes a tree class and a tree node class. A tree class instance contains one or more tree node class instances. Each tree node class instance contains one or more of, but is not limited to, an image button instance and a prompt instance. A tree instance is dynamically altered upon an event, such as a user action, without further accessing the server.

In yet another embodiment, the classes can be used to implement any or all of a selection list, a drop down list, or a combo box.

Finally, the set of classes can further be used to implement a model view controller (MVC) model.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A and 6C are code segments of a Web page as downloaded from a Web server, while FIGS. 6B and 6D are the respective code segments of the same Web page after processing by a browser.

DETAILED DESCRIPTION

Figure 1:
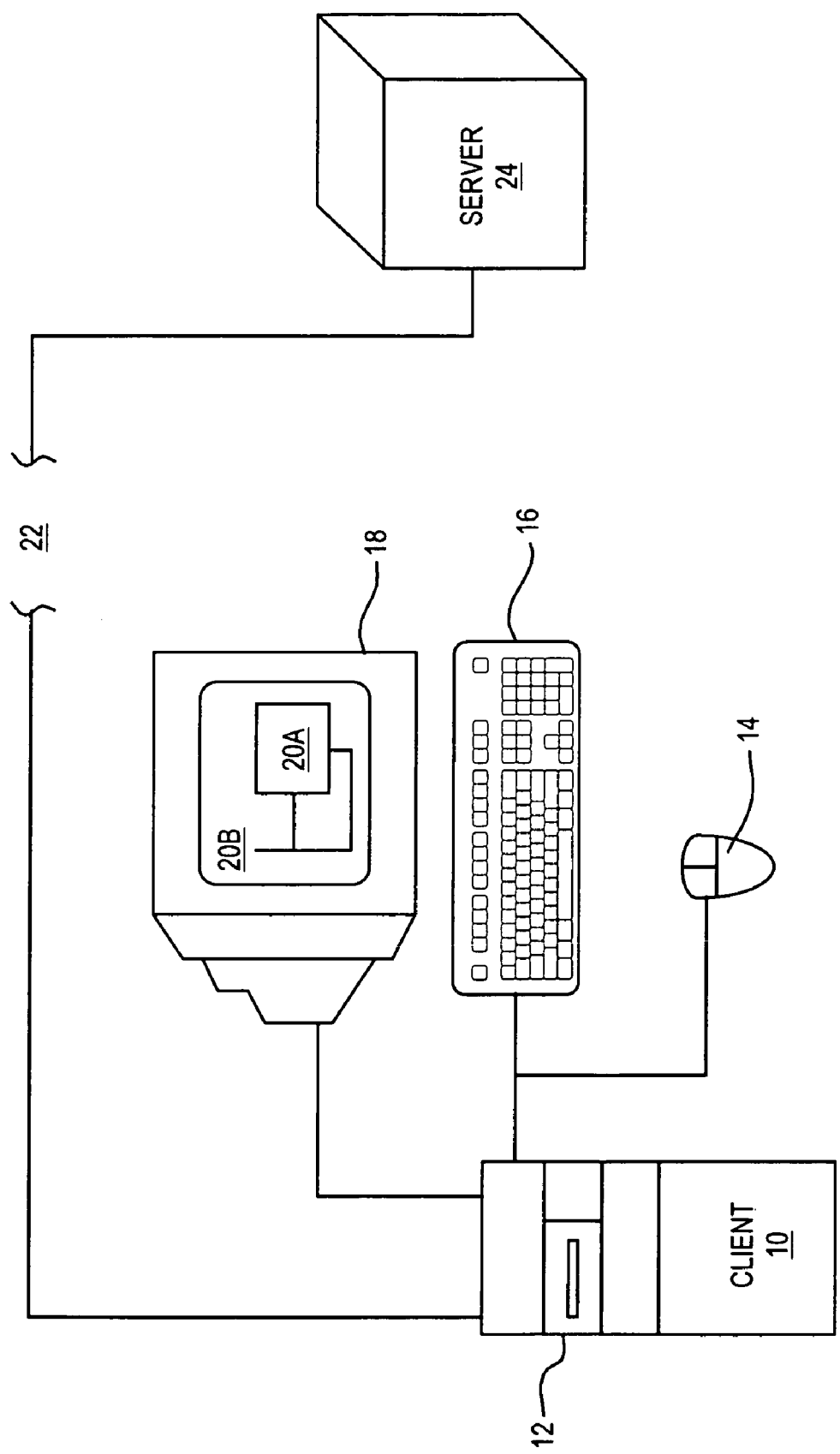
FIG. 1 is a schematic diagram illustrating a client and a Web server.

FIG. 1 is a schematic diagram illustrating a client computer 10 and a server computer 24.

A Web browser runs on the client computer 10, which typically includes internal mass storage and memory (not shown) as well as one or more removable media drives 12 such as a floppy disk drive, CD-ROM drive or DVD-ROM drive. The client computer 10 usually has a keyboard 16 and a mouse 14 for user input. In addition, the client computer 10 has a monitor 18 for displaying output to the user.

The client computer 10 displays information on the monitor 18 in "windows," where each executing application formats and displays information in one or more windows. In the exemplary system of FIG. 1, two windows 20A, 20B are shown.

In a Web-based application, a client browser running on the client computer 10 communicates with a web server executing on a server computer 24 over some medium 22 such as the Internet. The browser makes requests to the server, and the server responds by returning a document which is typically formatted using hypertext mark-up language, or HTML.

It will be apparent to those of ordinary skill in the art that methods involved in the present system for a dynamic tree control, formulas and equations may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

Figure 2:
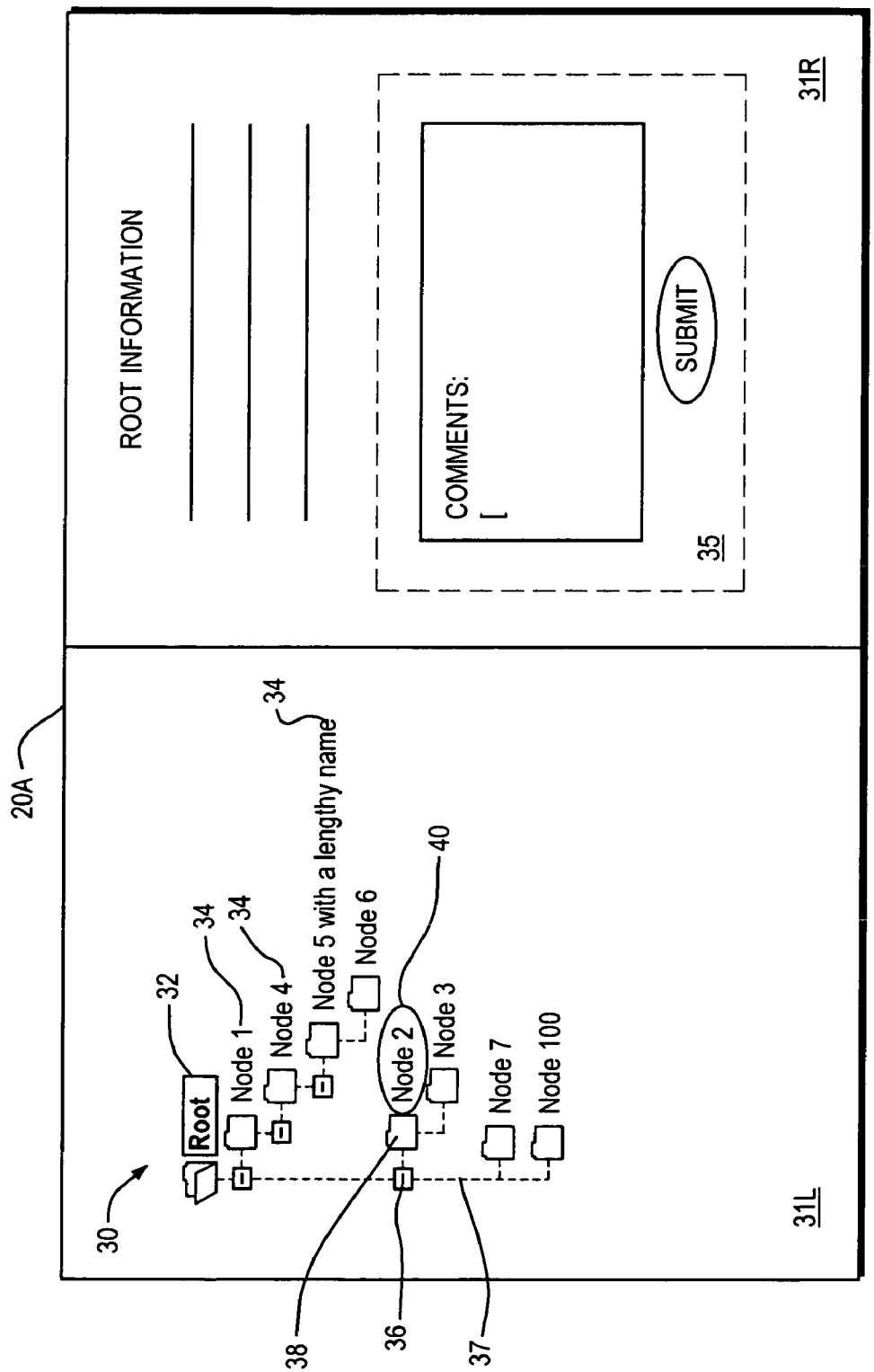
FIG. 2 is an illustration of a tree control in a window of the computer screen of FIG. 1.

FIG. 2 is an illustration of a tree control in a window 20A of the computer screen of FIG. 1. In this exemplary application, the window 20A is divided into two panels. In the left panel 31L is a tree control 30. In the right panel 31R, information about a selected node is displayed, including an editable form 35.

The tree control 30 of FIG. 2 comprises several nodes 34. A root node 32 comprises the highest level of the tree 30. One level hierarchical level below the root node 32 are Node 1, Node 2, Node 7 and Node 100. Except for the root node, each node which has lower level nodes is associated with a collapser 36 which indicates whether the node is expanded or collapsed. For example, Node 2 is the parent node to Node 3. Node 2 is associated with the collapser 36 which indicates that Node 2 has been expanded, i.e., its immediate children, in this case just Node 3, are displayed.

Note that each node has a label 40. In addition, in this example, each node also has an associated folder icon 38. Typically, a folder icon is closed or open to indicate the status of the associated node, although in some applications it may be desirable to represent more than two states with many different icons.

When the user selects a currently unselected node 34, this newly selected node is highlighted, and the information displayed on the right panel 30 of the window is updated to reflect information about the selected node.

Standard HTML normally supports only a flow layout pattern such that the contents of a page described using HTML flow from left to right and top to bottom. HTML lacks absolute positioning of content, which is very desirable in most applications, including tree controls. With HTML, the content of a page cannot be dynamically changed. Thus, developers must rely on page refresh methodology, wherein a new page is requested from the server if the page's contents are to be changed.

DOM exposes the HTML elements of a web page to a scripting language such as JavaScript for manipulation. For example, in the code snippet below, once the HTML document is loaded, a JavaScript script can manipulate the text area element.

```
<FORM name=f1 id=f1>
<INPUT type=textarea name=t1 id=t1>
</FORM>
```

This manipulation can be done by using a DOM-enabled statement in the <SCRIPT>-tagged section of a document, such as:

document.f1.t1.value="elephant"

The displayed text corresponding to the value of the text area identified as "t1" immediately changes to the specified value, in this case, "elephant."

Here, "document" is an object associated with the HTML document, exposed by the DOM to any script referring to "document." Similarly, "f1" and "t1" are DOM objects associated with the FORM and text-area elements respectively.

In the same way, DOM exposes the layer objects of the present invention which are rendered on the browser to the scripting language. To get the DOM reference to a layer object, for example, the following line of code returns the layer object for Netscape (NS) browsers:

document.layers ["lyr-name"].

On the other hand, for Microsoft's Internet Explorer (IE), the lines document.all["lyr-name"]
document.all["lyr-name"].style return the layer object and the style sheet object associated with this layer respectively. There is presently no equivalent for a style sheet object for NS. As of version 4.7, Netscape is not fully compatible with CSS standards. In an embodiment of the present invention, scripts are "conditionalized" so as to work correctly for both browsers.

The combination of HTML with JavaScript, CSS and DOM gives developers great flexibility in dynamically positioning contents and changing contents dynamically. DHTML provides a new paradigm in content presentation on a browser.

HTML Controls

Web pages often include one or more "forms," which allow a user to enter information through various form elements or controls such as menus, buttons, selection lists, text entry boxes, etc. These HTML form elements are machine dependent, and their look and feel cannot be easily changed. Applications must use whatever look and feel the browser provides. For example, using just HTML, there is no way for an application to provide icons for each item in a selection list.

In fact, there are several drawbacks to using HTML controls. First, a user-defined look and feel cannot be implemented for form elements such as controls. For example, if a browser provides only a 3D look for all of the HTML elements, then a text field could not be made to look flat. Second, the look and feel of the controls varies depending on the browser being used and on the platform itself. In addition, tree controls or tree elements are not defined in the standard set of HTML elements. Standard HTML also cannot provide icons for each item in a selection list or dropdown combo box. Further, standard HTML cannot provide an image as an alternative to the caption for each item in a selection list or combo box.

Finally, while there is always potential for the browser to run out of memory, in the case of HTML, because all elements are "heavy" elements, the browser is likely to run out of memory much sooner than it would with Javascript and DHTML.

With DHTML, an Internet application can provide its own unique look and feel. This enables a software vendor to standardize the look and feel of all of the controls in its applications products. DHTML provides the ability to define a standard look and feel on an Internet platform.

DHTML Controls

DHTML controls of the present invention are rendered on the screen using CSS layers in combination with HTML <DIV> tags. Each "layer" represents a rectangular control area that can be dynamically positioned within the HTML document page and in which HTML contents can be rendered. This layer is a basic component used by an embodiment of the present invention. Combinations of layers can be used to produce any visual control.

A layer is capable of receiving several mouse events defined in the DOM specification, including MouseMove, MouseOver, MouseOut, MouseDown and MouseUp events.

Each layer can contain one or more sub-layers, forming a "containment hierarchy" of layers. For example, a selection list control might have an outer container that holds a number of item/description layers stacked one by one.

The present invention automates the process of rendering CSS and <DIV> tags as well as the process of hooking up events. To this end, JavaScript methodology is used to take advantage of inheritance and the composition models inherent in object oriented programming.

A particular embodiment is included in Oracle Configurator, version 11.5.3, commercially available from Oracle Corporation, Redwood Shores, Calif.

Figure 3:
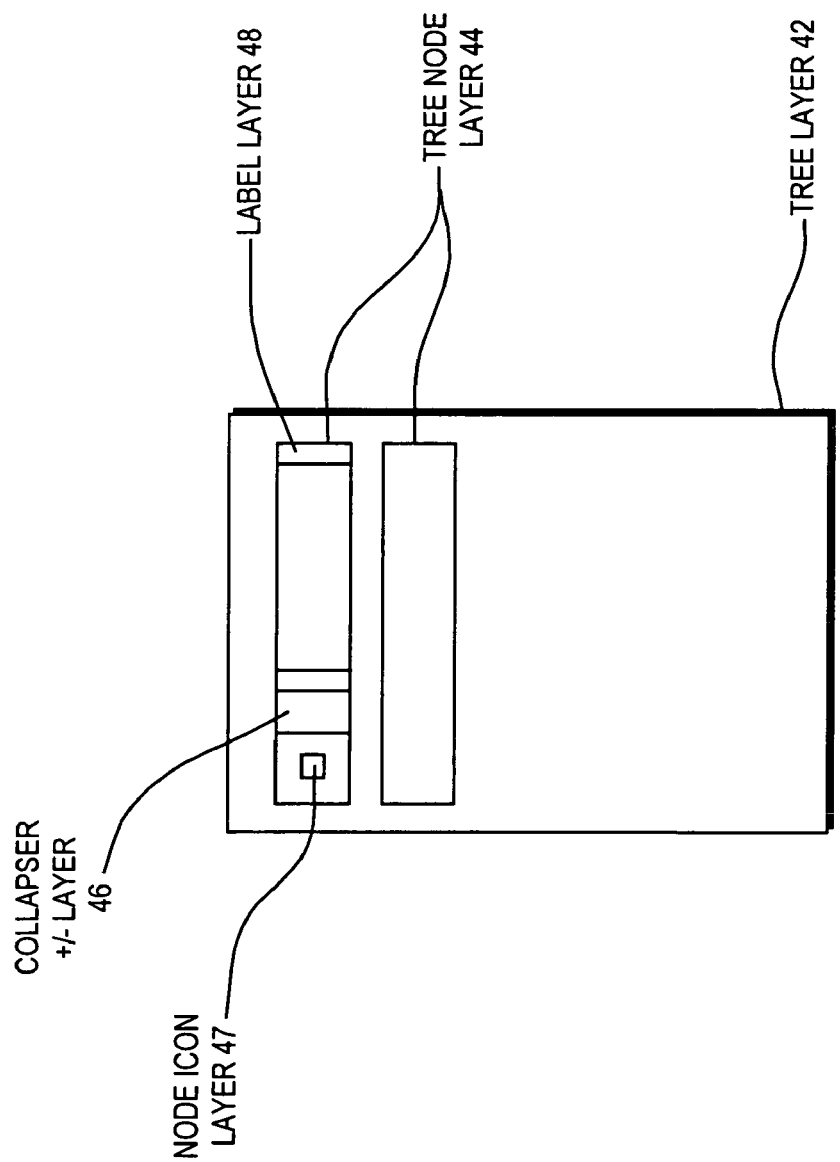
FIG. 3 is a schematic diagram illustrating the layers of the tree control of FIG. 2.

FIG. 3 is a schematic diagram illustrating the layers of the tree control of FIG. 2. The tree control 42 is the top layer, comprising the entire control. The tree control 42 contains one or more tree node layers 44. Each tree node layer 44 in turn can contain a collapser layer 46, a node icon layer 47 and a caption on label layer 48. These are the layers used by the present invention. Of course, the tree node layer 44 is not restricted to just these sublayer types.

The collapser layer 46 contains a Collapser (+/-) icon which, when clicked on, expands and collapses the corresponding tree node. The node or folder icon layer 47 indicates a state of the node and the caption layer 48 node provides a description of the tree node. In one embodiment, each tree node layer is stacked from top to bottom and positioned from the left side with indenting offset to denote the hierarchy level.

A tree line layer is drawn from the last child of each branch to its parent node. Z-ordering is employed, such that when a tree line crosses a child node at the same hierarchical level, the z ordering or z-index governs the relative placement of controls over one another. In one embodiment, the z-index of tree line is one less than the z-index of the tree node layer. Thus, the tree line has a lower z-index than the tree node layer, which contains the collapser icon image, and the tree line looks continuous.

For example, in the tree control of FIG. 2, Node 100 is the last child at its hierarchical level, and it draws the tree line 37 up to its parent node which happens to be the root node 32. The tree line 37 intersects with the collapser icon 36, but has a lower z-index than the collapser icon 36. Therefore, the collapser icon 36 is visible while the portion of the tree line which intersects with it is not.

When a new node is added to the end of a branch, the new node is drawn, and then the tree line from the previous last node is moved or given to the new last node and redrawn to extend to the new node.

When the last node of a branch is removed from the tree, the node first checks whether a previous sibling is available or not. If there is a sibling node, then the tree line is passed to the sibling and the node being removed is deleted. The previous sibling is now the last node and has the tree line. If there is no sibling, the node and its tree line are simply deleted.

Figure 4:
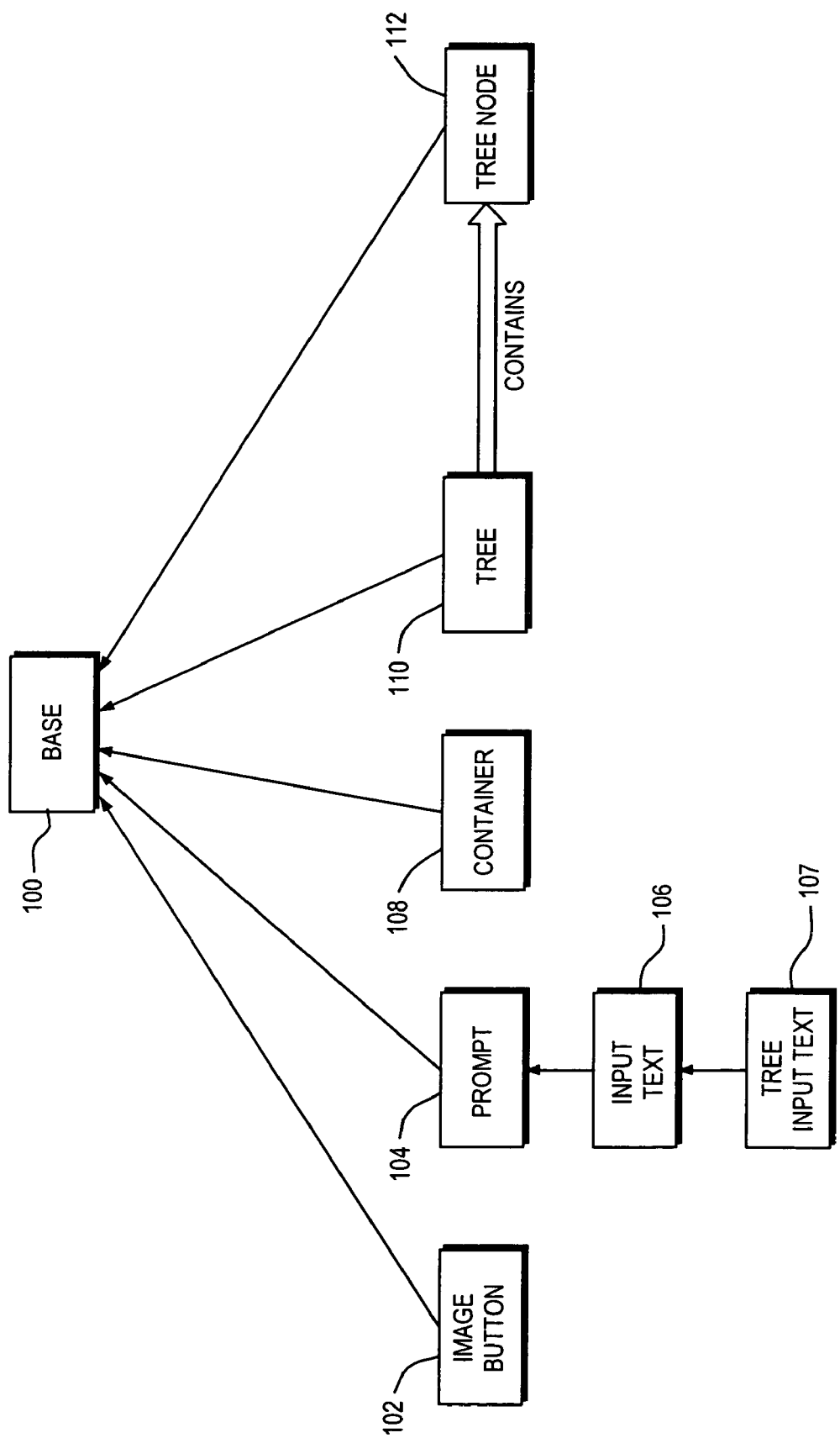
FIG. 4 is a inheritance diagram showing the inheritance hierarchy of the classes used by an embodiment of the present invention to implement the tree control of FIG. 2.

FIG. 4 is an inheritance diagram showing the inheritance hierarchy of classes used by an embodiment of the present invention to implement a tree control such as that shown in FIG. 2.

The Base class 100 is the base class for all of the JavaScript layer classes developed for DHTML controls. This class holds CSS property information and has the capacity to generate a style sheet, to render <DIV> tags, to communicate with a browser's Document Object Model API in order to obtain DOM references to the Web page, and to obtain mouse events such as MouseDown, MouseUp and MouseClick events from the browser.

For example, the statement lyr.setDimensions (100, 100, 300, 400)

sets the dimensions of the layer identified by "lyr" to 300 by 400 pixels, and positions the layer at 100 pixels from the left and 100 pixels from the top.

Several set( ) and get( ) methods are defined within the Base class 100. Each of these methods sets and gets a style sheet property. Almost all of the style sheet properties related to the browser are supported in the Base class. Common style sheet properties include left, top, width, height, color, background-color, z-index, font-style, font-name, font-weight, font-size, border-color, border-width.

The Base class 100 also provides methods to move or slide the associated layer to a specified position and to change the dimensions of the layer at any time.

The name property identifies each layer object rendered on the browser. A name is required to be unique.

The getHTMLObj( ) method returns the DOM object by communicating with the browser's DOM application program interface (API). The actual connection takes place in the connect( ) method.

The tree line layer is a base instance.

The ImageButton class 102 represents an image control capable of raising mouse click events to "event listeners," described below.

The ImageButton class 102 inherits from the Base class 100. It provides button behavior and can have an associated image. An image button can be made to indicate a status or condition by associating it with two images, for example on and off status images, or selected and unselected condition images. When a user clicks on the image button, it toggles to the alternate state or condition. This class provides a set of methods to set on and off images. If toggle behavior is not required, the event can be ignored and a single image is always shown. An image button also raises a high-level onClick event when the user clicks the image button.

The collapser 46 and node icon 47 layers are image button instances.

The Prompt class 104 represents a caption/label control. The InputText class 106 inherits from the Prompt class 104 and represents a textfield control.

The Prompt class 104 inherits from the Base class 100 to provide caption/label functionality. The Prompt class 104 provides caption-related methods such as setCaption( ) and getCaption( ). A Prompt instance raises a CaptionChange event whenever the caption changes.

The InputText class 106 inherits from the Prompt class. This class includes convenient methods to set and get the text value. When the user performs a mouse down on the input text layer, if enabled, a MouseDown event is raised and the input text layer brings up an HTML text field element so that user can edit the input text value. When the user presses enter or clicks somewhere else, an "onBlur" event is raised and the input text layer removes the text field and displays the usual layer.

The TreeInputText class 107 inherits from the InputText class. An object of this class brings up the editable text field only when the user clicks twice on the object. This is similar to tree control behavior found normally on Microsoft's Windows Explorer. An editable text field appears only when the tree control is set to an editable mode.

The Container class 108 represents a container that holds hold one or more other components or class instances.

The Container class helps to manage a collection of layer objects within the Container layer. The Container class provides for the grouping of layers. This class is not used in the current tree control implementation, but is included here for completeness.

The add( ) method adds a child layer to the container layer. Other helper methods exist, such as the contains( ) method which checks whether a layer is a child of this container layer or not.

From the basic set of classes discussed thus far, a set of complex controls can be developed, including but not limited to: a tree; a selection list control; a combo box; or a dropdown control.

The Tree class 110 provides methods to add nodes, remove node, programmatically select nodes, get the selected node and expand and collapse the tree structure.

The TreeNode class 112 represents nodes 34 in the tree control 30. A tree contains one or more tree nodes.

The Tree and TreeNode classes are discussed in more detail below.

Figure 5A:
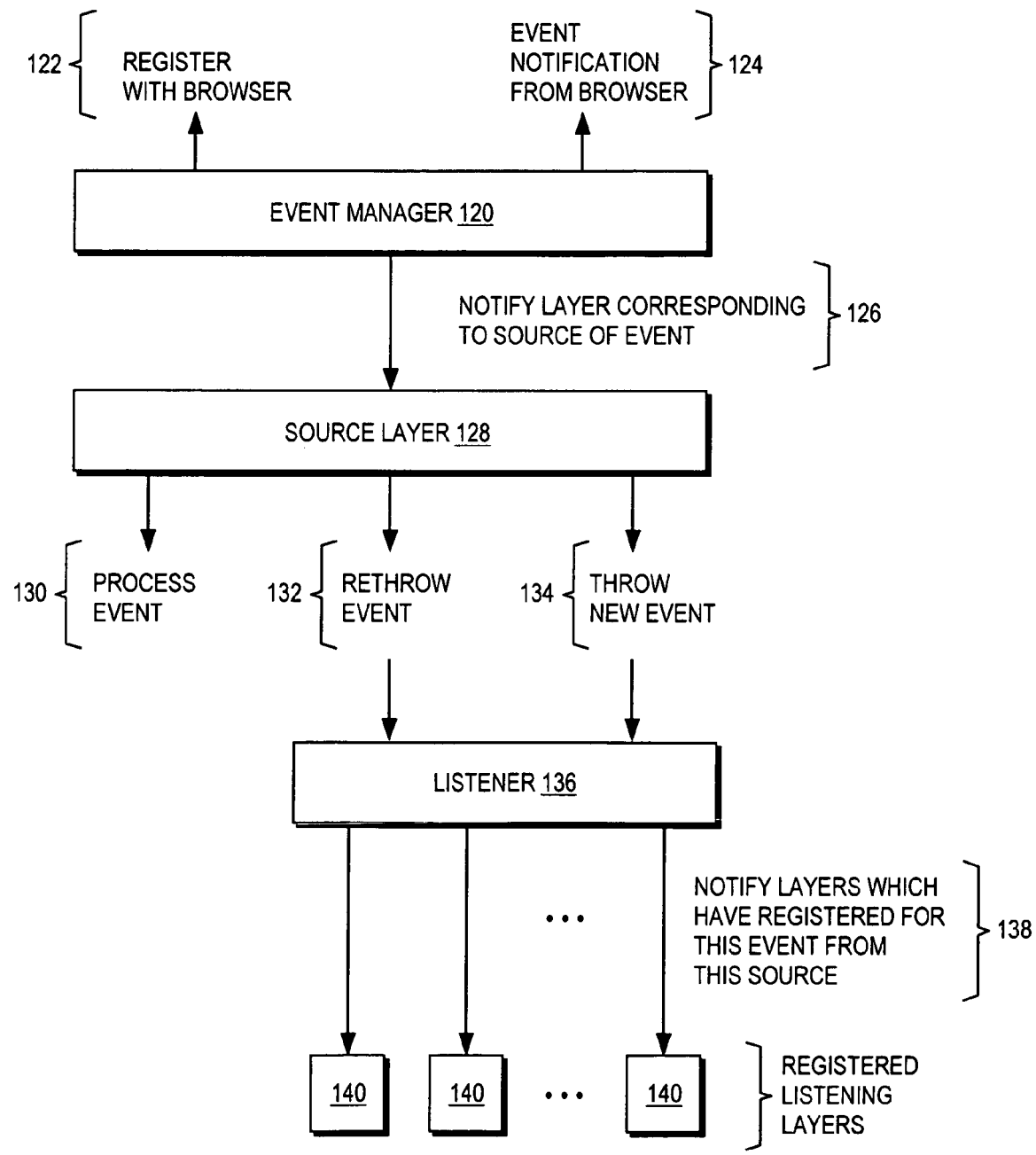
FIGS. 5A–5C are a schematic diagrams illustrating event processing as performed by an embodiment of the present invention.

FIG. 5A is a schematic diagram illustrating event processing as performed by an embodiment of the present invention.

The EventManager class 120 captures mouse events on the document from the browser and routes each event to a registered component. An embodiment of the present invention uses a delegation event model technique, wherein a second object/component registers to receive notification that an interesting event has occurred on or within a first component. This technique allows the second, listening object to listen only for events in which it is interested.

An Event Manager object 120 registers with the browser at 122 to receive event notifications. An event notification is received from a browser upon a particular event, as at 124. The Event Manager 120 in turn notifies the layer 128 corresponding to the source of the event, at 126. The notified layer 128 can then do several things. For example, it can process the event at 130. In addition it can "re-throw" the event by notifying other listening layers through the "Listener" 136 described below, as at 132. Finally, it can throw a new event, as at 134, to the Listener 136. Note that the source layer 128 can perform one, two or all of these actions 130, 132, 134. When notified, the Listener 136 itself notifies, at 138, all layers 140 which have registered with it for this event from that particular source layer. The registered listening objects 140 can then process the event, rethrow the event or throw new events.

When a layer is marked as "launched" after rendering, the layer registers with the EventManager.

The EventManager instance holds a list of all objects registered to receive events. When the EventManager receives an event from the document window, the event includes the ID of the source of the event, i.e., the layer in which the event took place, and then routes this event to the respective layer object.

An HTMLHelper class provides a convenient set of methods that perform the actual interaction with a layer object once the layer object is rendered on the screen. After rendering, or "launching," of an layer, each setXXX( ) method call that changes the property of the layer propagates the change to the corresponding DOM objects. The object layer on the browser screen is then changed accordingly.

For example, the Base.setBackgroundImage( ) method calls HTMLHelper.setBackgroundImage( ) if the instant object has been launched, i.e., rendered. The HTMLHelper.setBackgroundImage( ) method in turn uses the DOM API to effect the change to the object on the screen.

How do we know when to go through DOM? In one embodiment, we walk through all JavaScript objects and set the launched property for each object to true after rendering style sheets and <DIV> tags.

The HTMLHelper class provides methods for changing the dimensions, the background color, the background image and the visibility of a layer, and for writing new contents to a layer and for creating a new layer.

The event model of the present invention is based on event delegation. As described with respect to FIG. 5, an interested party registers with the event source for event notifications. The source then informs the interested party when the specified event occurs on the source. This model is more efficient and convenient than other models and offers much flexibility. Multiple listeners can register for the same event from a source and each listener can register for just the events it is interested in. This model also allows high-level meta-events or semantic events, such as row-added or row-deleted events and so on, to be generated.

The Listener class 136 maintains a list of registered listening objects, i.e., interested parties, for various events. This class provides methods such as addListener, which an interested party calls to register for an event.

The syntax for the addListener( ) method is:

addListener (sub, target, type)

where "sub" is an event type for which the calling routine is interested in listening. For example, if the calling object wants to be notified of a MouseDown event, then the sub argument is "MouseDownCallback." The "target" argument is a reference to an object that implements mouseDownCallback method, and is typically the object calling the addListener routine to register itself as a listener.

The "type" argument is optional. When it is provided, the only valid value is "super." Where there are multiple objects registered to listen for the same event, in some cases one of these objects may need to be notified of the event first. That object will register itself as a super listening object.

The Listener 136 notifies registered listening objects of an event with the notifyListeners( ) method. The method notifyListeners( ) informs all registered listeners about the specified event. The syntax for the this method is:
notifyListener (sub, event, eventSource).

The "sub" argument is the same as for addListener( ). The "event" argument is an event object. For low-level events, both Netscape and Internet Explorer provide an event object. For high-level events such as mouse click and double click, the source of the event throws an appropriate value.

The "eventSource" argument is the source object in which the actual event occurred.

The Styles class is a collection class, consisting of a collection of Style class objects. A Style object holds common style properties for a layer, such as font-style, font-weight, font-family, font-size, etc. The Style object writes <SPAN> level, i.e., sub-element level, style information.

For example, in a tree control, all of the labels have the same font, so the amount of font information can be reduced by generating only one <SPAN> level style and making all labels use that <SPAN> level style information. <SPAN> level style information can be, for example, of the form below:

```
<STYLE type="text/css">
....... (Regular CSS information)
    .treeFont {font-family:arial; font-size:10pt; font-style:italic; font-weight:bold;}
</STYLE>
<DIV ID=z1><SPAN CLASS=treeFont>Node 1</SPAN></DIV>
<DIV ID=z2><SPAN CLASS=treeFont>Node 2</SPAN></DIV>
```

In the above example, two node labels inherit the same font style information. If the <SPAN> level style were not used, then the same font information would have to be repeated in the CSS tag for each label. In this manner, the amount of information generation is greatly reduced.

Tree and TreeNode Classes

A TreeNode represents the node of a tree. A tree node is like a container, and in one embodiment, can hold a collapser (+/− icon), a node (or folder) icon and a node label. The TreeNode class provides methods for adding and removing nodes, getting a parent node, and for getting a next or previous sibling node. In addition to raising or throwing lower-level mouse events, a TreeNode can also raise semantic events to indicate tree node collapse and tree node expand events when the user tries to expand and collapse the tree.

A Tree holds the entire set of tree nodes. The Tree class provides methods for adding and removing a node, selecting a node and getting a selected node. A tree node is added with the following call:

Tree.addNode (relative, relationship, key, text, bUnsatisfied, iconNormal, iconSelected);

The "relative" argument is either a string or a tree node object. For a root node, "relative" is null. For a child node of root, the relative value can be either the root node's key or the root node object itself.

The "relationship" argument is an integer constant. Valid values are $AT_{FIRST}$, $AT\_LAST$, AT_PREVIOUS, AT_NEXT, and AT_CHILD, which define a node's relationship to its relative specified in the first argument. For the root node, the relationship value can be null.

The "key" argument is the key to be associated with the node. Each node added to the tree must have a unique key, which allows for faster searching of the nodes based on the key value. In addition, when adding a new node, the key can serve as a "relative" argument to the addNode call, as noted above.

The "text" argument is a description or the label text for the tree node The "bUnsatisfied" argument is a boolean, i.e., true or false, value which indicates a satisfaction state of configuration node inside the configurator model in Oracle Configurator product. For normal use, the value is set to null.

The "iconNormal" and "iconSelected" arguments are references to folder icons used to indicate unselected and selected tree nodes respectively. Either of these can be changed at any time. The tree control of an embodiment of the present invention, for example, provides open and closed folder icons The arguments bUnsatisfied, iconNormal and iconSelected are optional.

The removeNode( ) method takes a node key as an argument, finds the parent of the node associated with the key, and delegates a delete( ) call to that parent node. The tree node then recursively deletes all of the parent's children from the tree, in effect, deleting the node selected by the user as well as all of that node's children.

The Tree control also supports different styles. Valid styles include, but are not limited to STYLE_NONE, STYLE_TREE_LINES_ONLY, STYLE_ICONS_ONLY and STYLE_TREE_LINES_AND_ICONS. The STYLE_NONE style indicates that the tree control is to be displayed with no collapser and folder icon. The captions are indented to show the hierarchy. The STYLE_TREE_LINES_ONLY style indicates that the tree control will display tree lines with collapsers and captions. The $STYLE_{ICONS}$_ONLY style indicates that the tree control displays folder icons and captions, but no collapsers. Finally, the STYLE_TREE_LINES_AND_ICONS style indicates that the tree control displays collapsers, folder icons and caption. In one embodiment, this is the default style if no style is set explicitly.

Figure 5B:
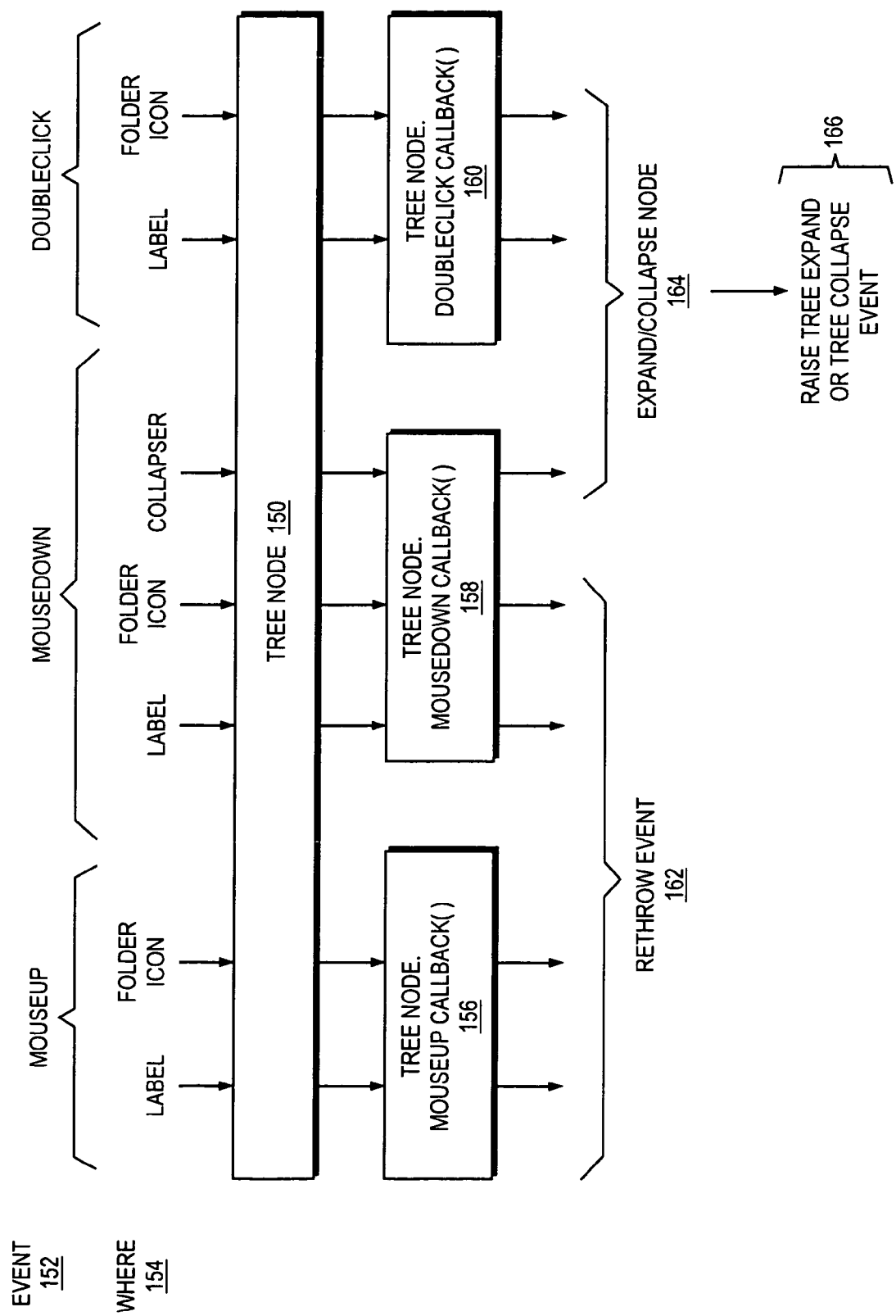

FIG. 5B is a schematic diagram illustrating the event processing of a tree node 150, which here corresponds to a registered listening layer 140 of FIG. 5A and to 44 of FIG. 3. As discussed earlier, a tree node object of a particular tree control embodiment can contain two image button objects, i.e., a collapser/expander icon and a folder icon, as well as a label object. A TreeNode object registers for the following events 152 in these three objects 154.

Within a Label, a TreeNode registers for MouseDown, MouseUp and DoubleClick events. Within a Folder Icon, a TreeNode registers for MouseDown, MouseUp and DoubleClick events. Within a Collapser Icon, a TreeNode registers for MouseDown.

When a MouseDown event occurs on any of these objects, the tree node 150 is notified and the treeNode.mouseDownCallback( ) 158 is called. If the MouseDown event occurs on the Label or Folder icon 47, the tree node "re-throws" the event at 162 to notify listeners registered with the tree node object. When the MouseDown event occurs on the collapser icon 46, the tree node 150 either expands or collapses, depending on its current expansion state.

When a MouseUp event occurs on a label 48 or folder icon 47, the tree node's 150 MouseUpCallback 156 re-throws the events to notify the listeners registered with the tree node object.

When a DoubleClick event occurs on the label 48 or folder icon 47, the tree is expanded or collapsed at 164 depending on its current state, by the doubleClickCallback 160.

Whenever a tree node is expanded or collapsed, the tree node respectively raises a treeExpand event or treeCollapse event 166. Why these two events? The tree or other objects can listen for these events and perform additional work, such as fetching more data from the server upon notification of one of these events. For example, it is not necessary for the server to initially provide all of the information to fully inform the tree. Rather, upon the expansion of a node, a request can be sent to the server for additional information needed to fill out the newly expanded node.

Figure 5C:
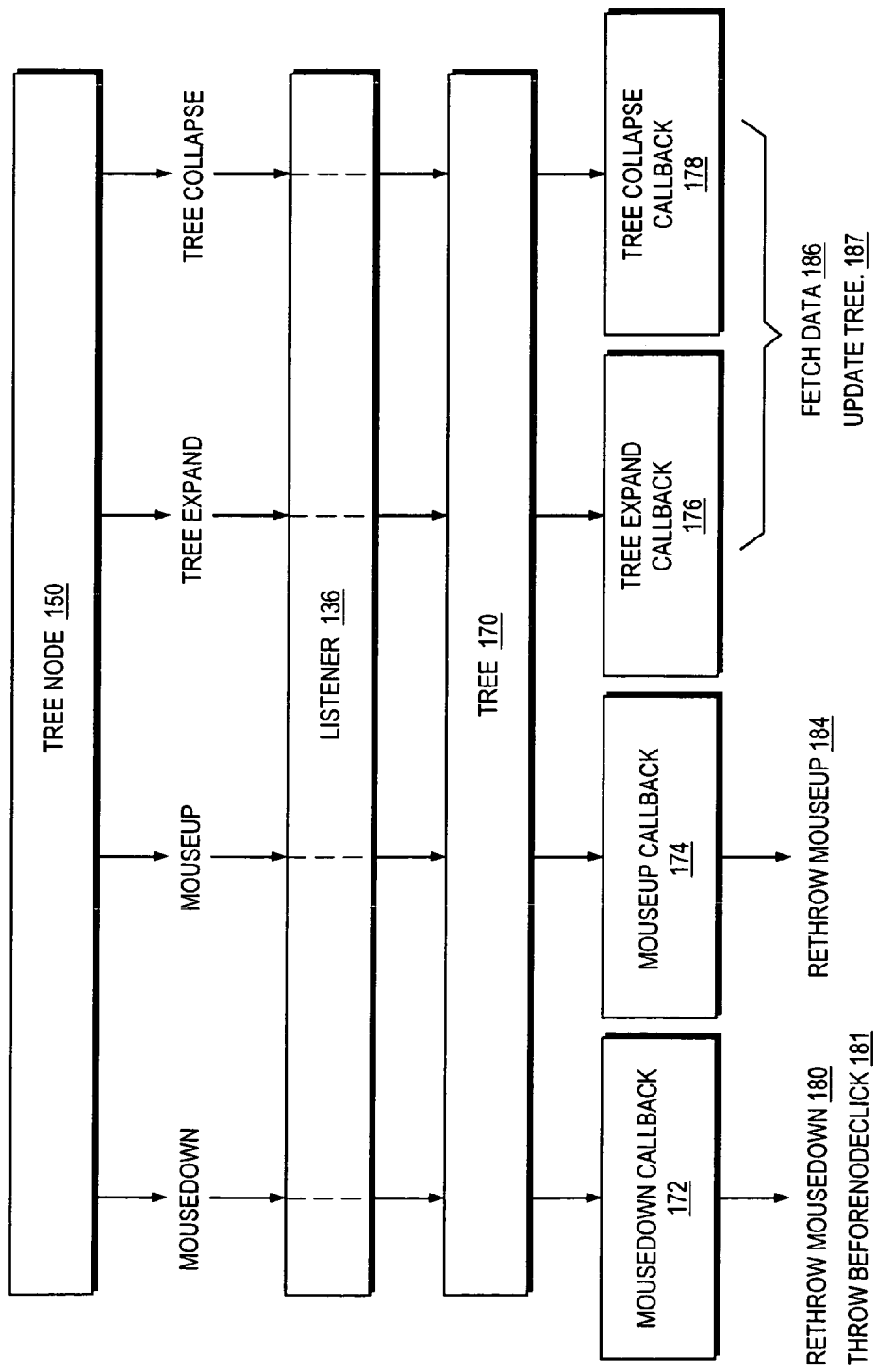

FIG. 5C is a schematic diagram illustrating the event processing of the tree 170, which corresponds to a registered listening layer 140 of FIG. 5A and to 42 of FIG. 3. When a new tree node is added to the tree, the tree registers for the following events from the new tree node:
1. Mouse down event
2. Mouse up events
3. Tree collapse events
4. Tree expand events The TreeCollapse 193 and TreeExpand 192 events are intended for future versions to support model view architecture and to fetch additional tree node data (Step 186) when nodes are expanded or collapsed, and to update the tree (Step 187) with the new data.

When a tree node 150 throws an event, it does so through a Listener object 136, as discussed previously. The Listener object 136 in turn notifies registered listening objects, such as the tree object 170, of the event.

Whenever a tree node object 150 raises a MouseDown event, the tree object 170 receives this event and performs the following actions:

First, the Tree object 170 re-throws the MouseDown event (Step 180) to listening objects registered with the tree object.

Second, the Tree object 170 throws a beforeNodeClick event (Step 181). Listening objects registered for this event handle the beforeNodeClick event and return either TRUE or FALSE. If any listening object returns FALSE, then the node click is canceled. If each listening object returns TRUE, the node is selected and the tree object 170 throws a nodeClick event (Step 182).

To see how the beforeNodeClick and nodeClick events are helpful, assume that in a Web-based application, a tree control is displayed in the left side frame as in FIG. 2, while the right side frame displays a form containing editable information related to the selected tree node. Now assume that a user edits a form field on the right side and then, without submitting the changes, selects another node.

A listening object that listens for the beforeNodeClick event can track the changes to the right side frame 32 (FIG. 2) and check for completeness, e.g., whether the edits have been submitted. If not, the listening object can cancel the node click so that the right side frame 32 does not change by returning FALSE. If, on the other hand, the right side is complete, the listening object returns TRUE, allowing the event processing to continue.

Thus, if all listening objects return TRUE, the tree objects 170 throws the nodeClick event. When a listening object receives the nodeClick event, it can change the right side frame.

The Tree control of the present invention is very flexible, and application developers using this control can make use of it in many ways. For example, the tree control can be used to display the hierarchy of a configuration product structure. The user can click on a node to navigate to different product screens. A Listener 136 listens for mouseUpCallback events, and when one occurs on a node, a request is sent to the server to change the screen on the right side.

When a MouseUp event occurs on a tree node 150, the tree node informs the tree object 170, which simply re-throws this event to listening objects registered for MouseUp events from the tree object.

ComponentManager Class

The ComponentManager class is a collection class that maintains all top-level components of a page. It provides convenient collection level methods such as generateCSS( ) to generate style sheets CSS for all the components in the page, renderComponents( ) to render DIV tags for all the components in the page, and launchComponents( ) to mark all of the components as having been rendered on the browser.

The collection methods walk through individual objects in the collection and perform the above said action one by one. The addComponent( ) method adds a component to the collection. This class also holds the Styles collection.

DHTML Sample Code

FIGS. 6A and 6C are HTML code segments which illustrate use of the present invention. FIGS. 6B and 6D are code segments which replace the code segments of FIGS. 6A and 6C respectivley, after processing by a browser.

Code segment 50 is a Javascript which is embedded directly in the HTML program. At Line 52, an Event Manager instance is created. At Line 54, a Component Manager instance is created. At Line 56, the tree control instance is created. Statements at 58 set various attributes of the tree. Statements at 60 add nodes to the tree created in line 56. Of course, in an actual application, the default configuration of the tree can be different.

At Line 62, a tree is added to the Component Manager. At Line 64, style sheets are created for all of the layers previously created, i.e., the tree nodes, collapsers, labels and icons. At Line 66 a function init( ) is defined which marks all of the components as rendered and initializes the Event Manager.

After interpreting the code segment 50, the browser replaces the code segment 50 with the code shown at 70 in FIG. 6B. This inserted text 70 includes style sheets for every layer in the tree, created by Line 64 of FIG. 6A. For example, Lines 72 comprise a style sheet for the tree layer while Lines 74 comprise the style sheet for the root node.

Code segment 80 of FIG. 6C is replaced upon rendering components with code segment 90 in FIG. 6D, which provides a <DIV> tag for each layer. For example, at Line 92, a <DIV> element has been created with id=t1. Thus, this first element is identified as t1 and therefore the tree with id=t1 is associated with the style sheet designated for t1 at Lines 72 of FIG. 6B.

FIGS. 7A–7G are screen shots illustrating the tree control implemented by an embodiment of the present invention, and the various operations which can be performed on the tree control.

Figure 7A:
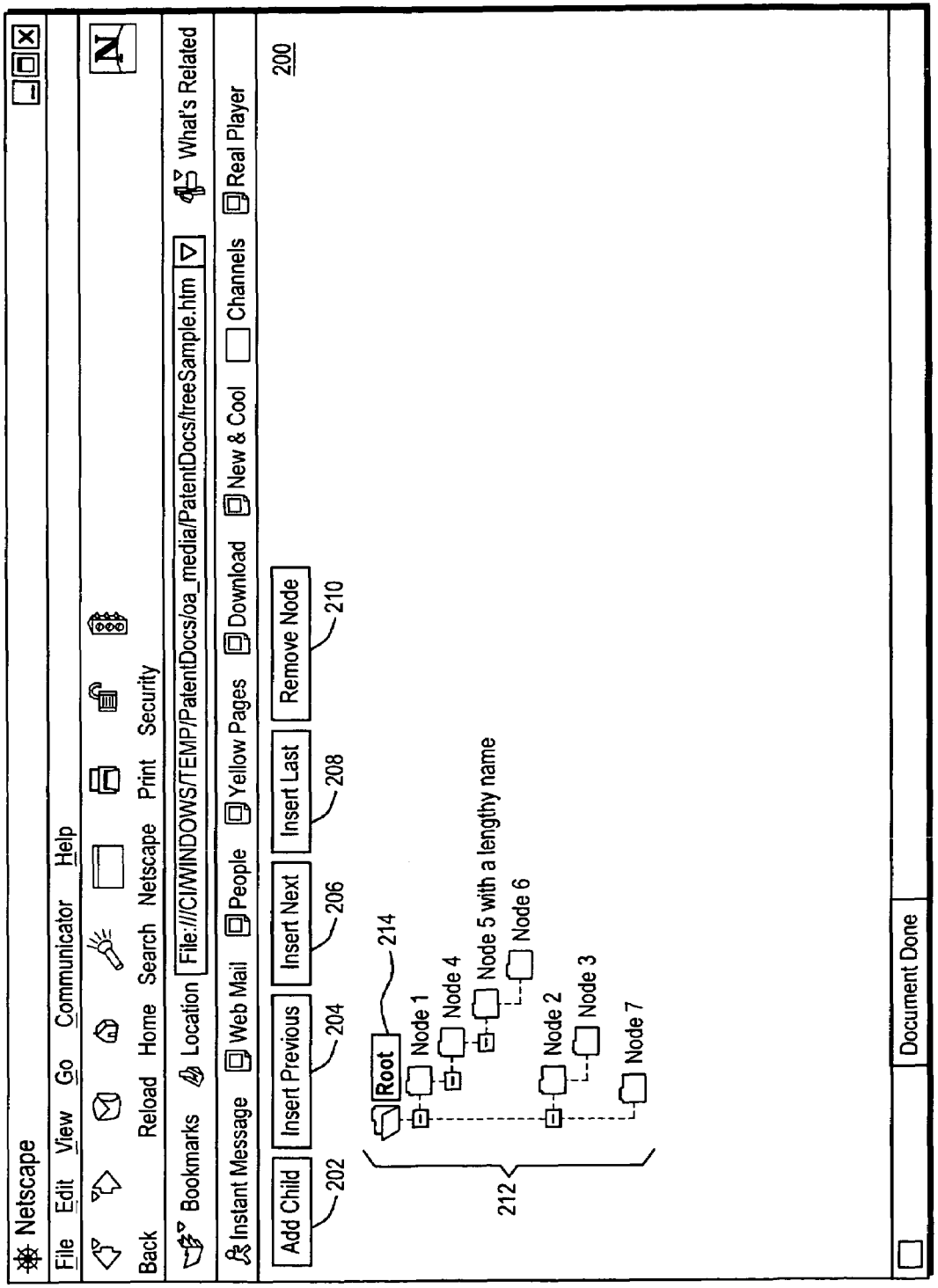
FIGS. 7A–7H are screen shots illustrating a tree control implemented by an embodiment of the present invention, and the various operations which can be performed on the tree control.

FIG. 7A is an illustration of the screen 200 that first appears when the HTML code is processed by the browser. HTML Buttons 202–210 appear at the top while the tree control 212 appears below. For this particular sample program, the root node 214 is initially highlighted. The actions of the HTML Buttons 202–210 are driven by a Javascript in the Web page, and are intended to demonstrate the capabilities of the invention. The actions executed by the HTML Buttons are provided respectively by the addChild, insertPrevious, inserNext, insertLast and deleteNode functions, which are referenced in within a <FORM> tag, as in the following sample code:

```
<FORM id=form1 name=form1>
   <INPUT type="button" value="Add Child" id=button1 name=button1
onclick="javascript:addChild ();">
   <INPUT type="button" value="Insert Previous" id=button2 name=button2
      onclick="javascript:insertPrevious();">
   <INPUT type="button" value="Insert Next" id=button3 name=button3
onclick="javascript:insertNext();">
   <INPUT type="button" value="Insert Last" id=button4 name=button4
onclick="javascript:insertLast ();">
   <INPUT type="button" value="Remove Node" id=button5 name=button5
      onclick="javascript:deleteNode ();">
   </FORM>
   These button functions are then defined within <SCRIPT> tags. For example, a
simple implementation might be the following code:
   <SCRIPT LANGUAGE=javascript>
   <!--
      var counter = 100;
      function addChild () {
         var key;
         key = t.getSelectedNode ();
         if (key)
               t.addNode (key, Tree.AT_CHILD, 'n'+ counter, 'Node ' + counter);
         else
               t.addNode (null, null, 'n'+ counter, 'Node ' + counter, 'rt');
         counter++;
      }
   function insertPrevious () {
      var key;
      key = t.getSelectedNode ();
      t.addNode (key, Tree.AT_PREVIOUS, 'n'+counter, 'Node ' + counter);
      counter++;
}
   ... (other functions defined) ...
//-->
</SCRIPT>
```

Figure 7B:
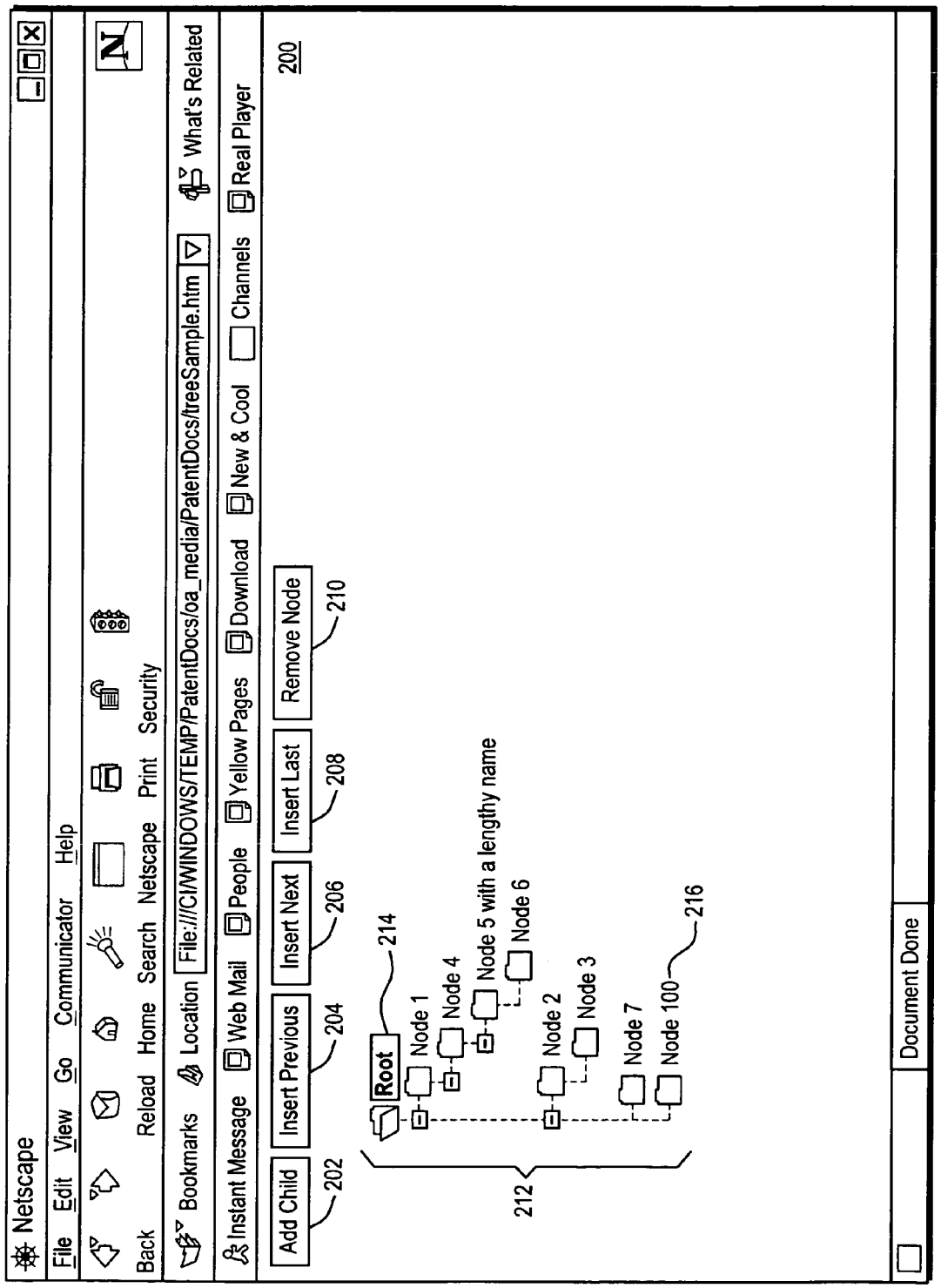

FIG. 7B is an illustration of the screen 200 of FIG. 7A showing that when the "Add Child" ImageButton 202 is selected by the user, a new node 216, Node 100, is added to the tree control 212.

Figure 7C:
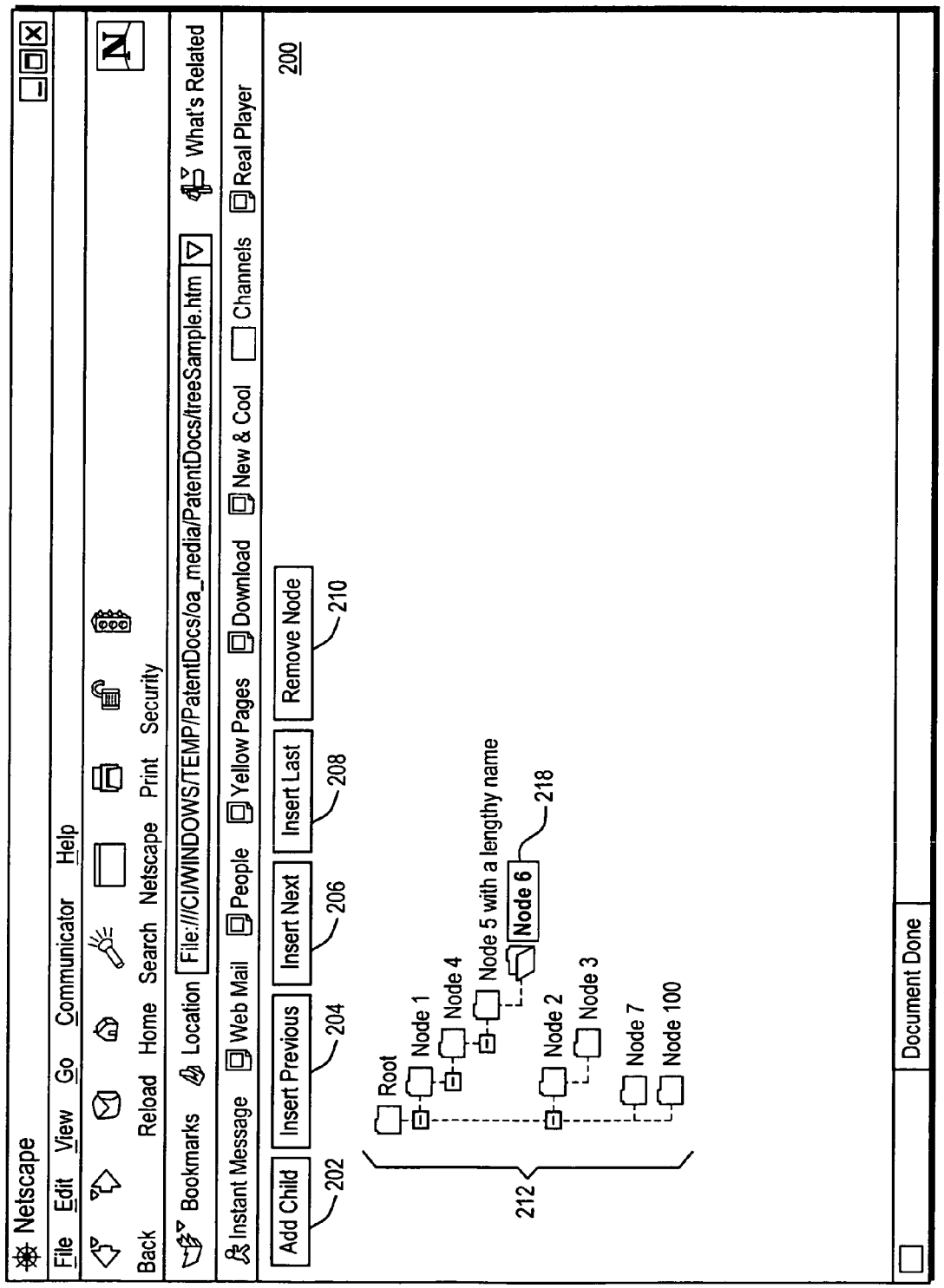

FIG. 7C is an illustration of the screen 200 of FIG. 7A showing that Node 6 218 has been selected and is now highlighted.

Figure 7D:
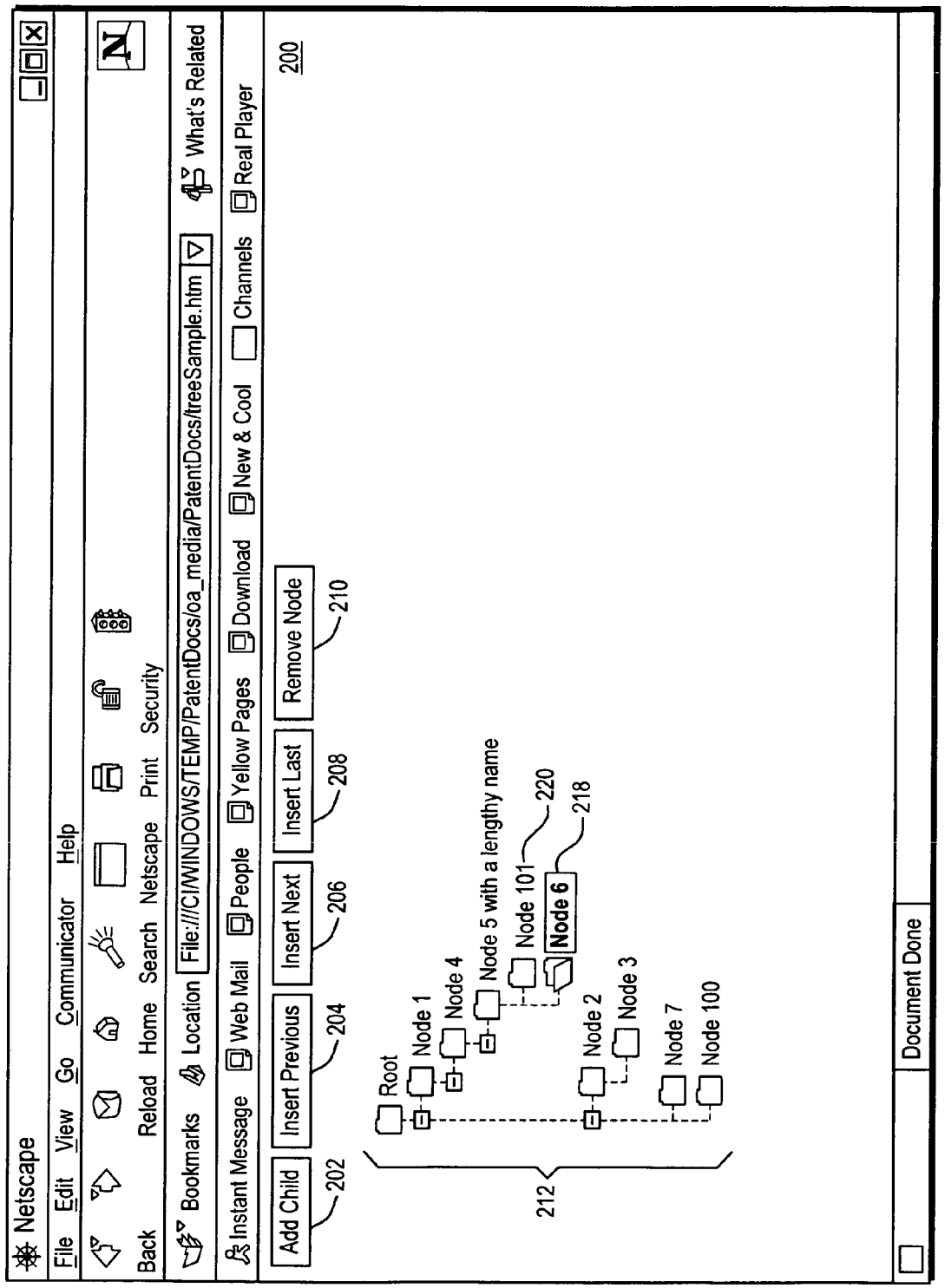

FIG. 7D is an illustration of the screen 200 of FIG. 7A showing that after clicking on the "Insert Previous" HTML Button 204, a new node 220, Node 101, is inserted before the selected node 218, Node 6.

Figure 7E:
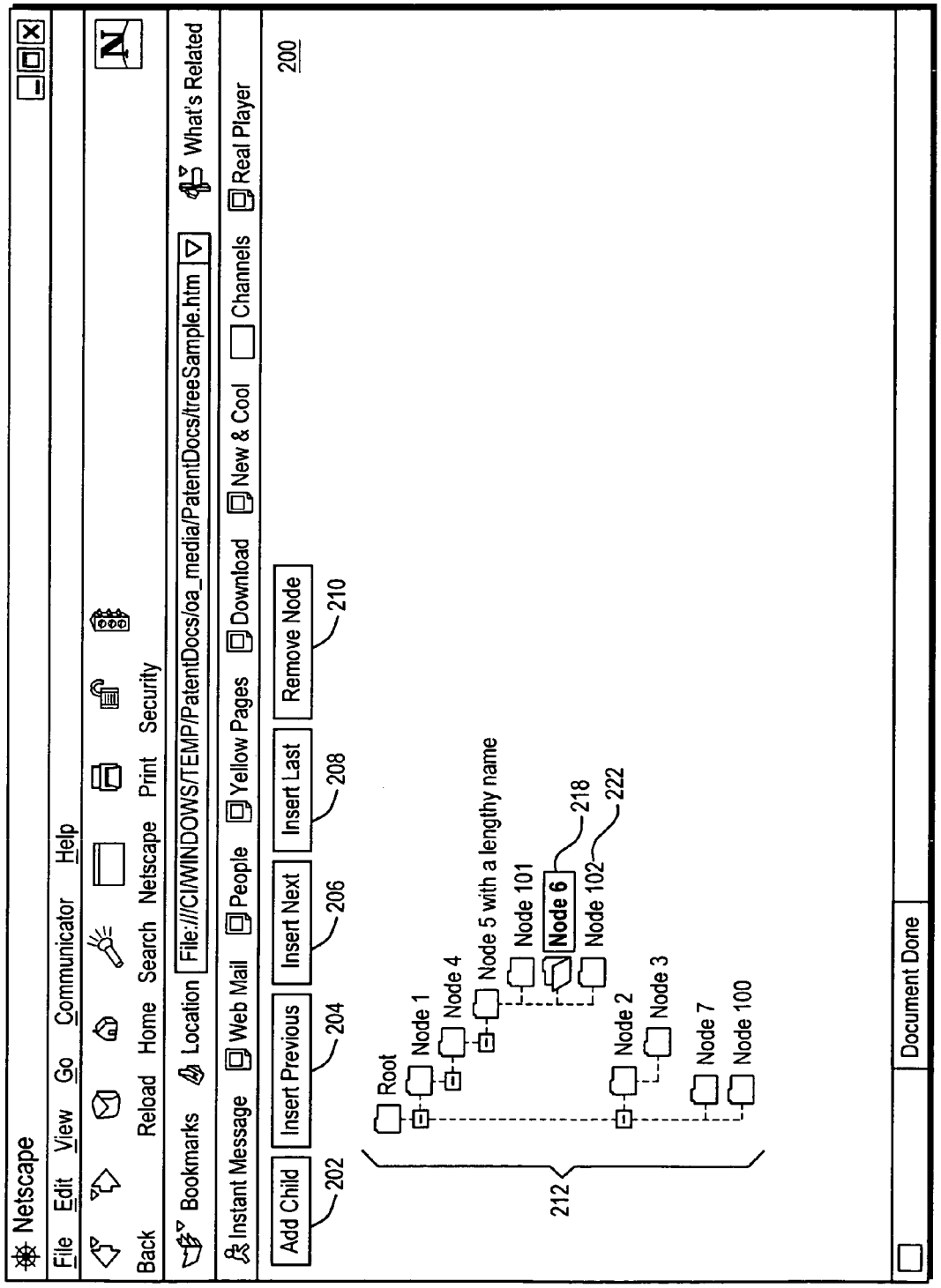

FIG. 7E is an illustration of the screen 200 of FIG. 7A showing that after clicking on the "Insert Next" HTML Button 206, a new node 222, Node 102, is inserted after the selected node 218.

Figure 7F:
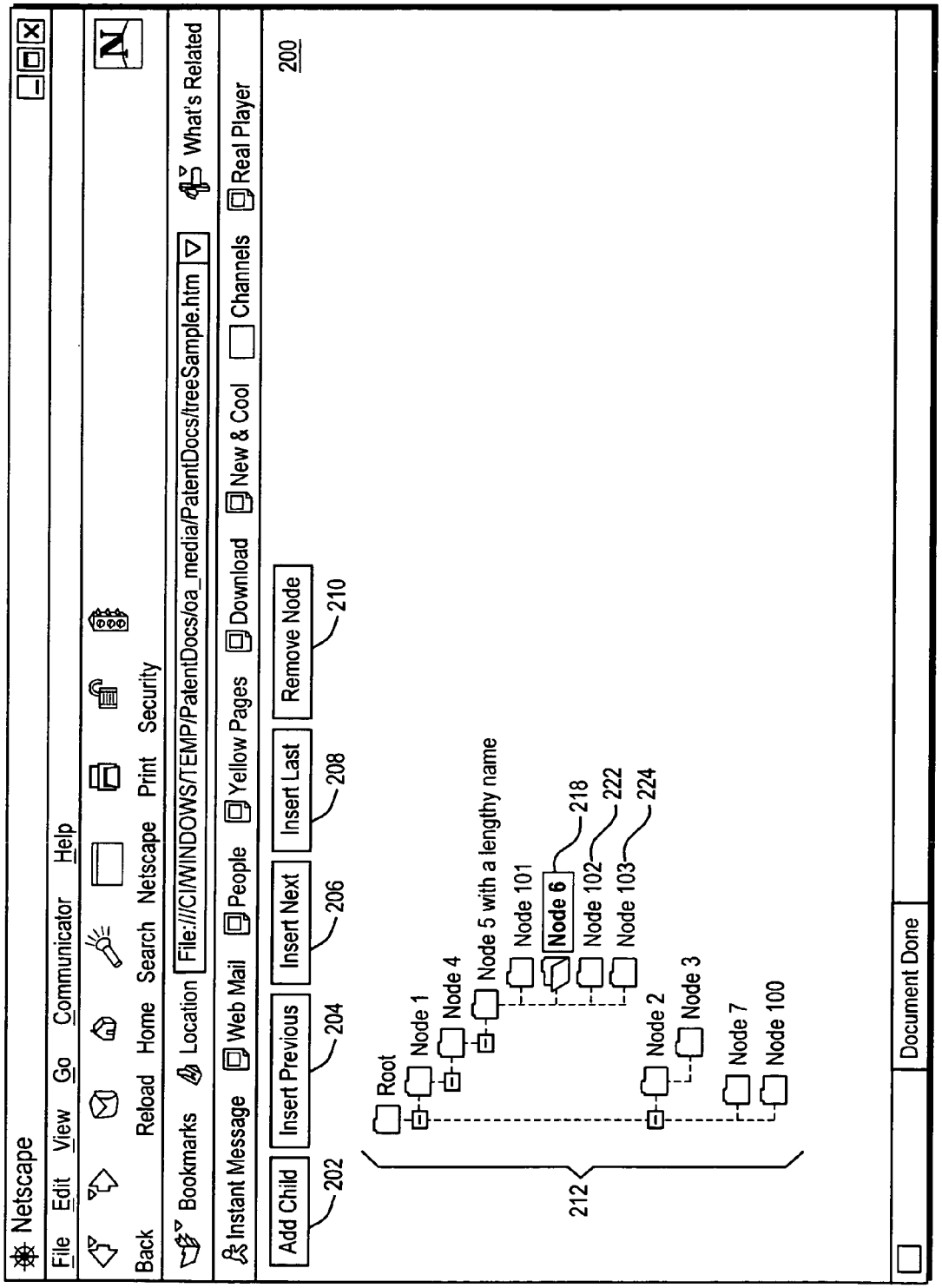

FIG. 7F is an illustration of the screen 200 of FIG. 7A showing that after clicking on the "Insert Last" HTML Button 208, a new node 224, Node 103, is inserted as the last node in the same layer as the selected node 218.

Figure 7G:
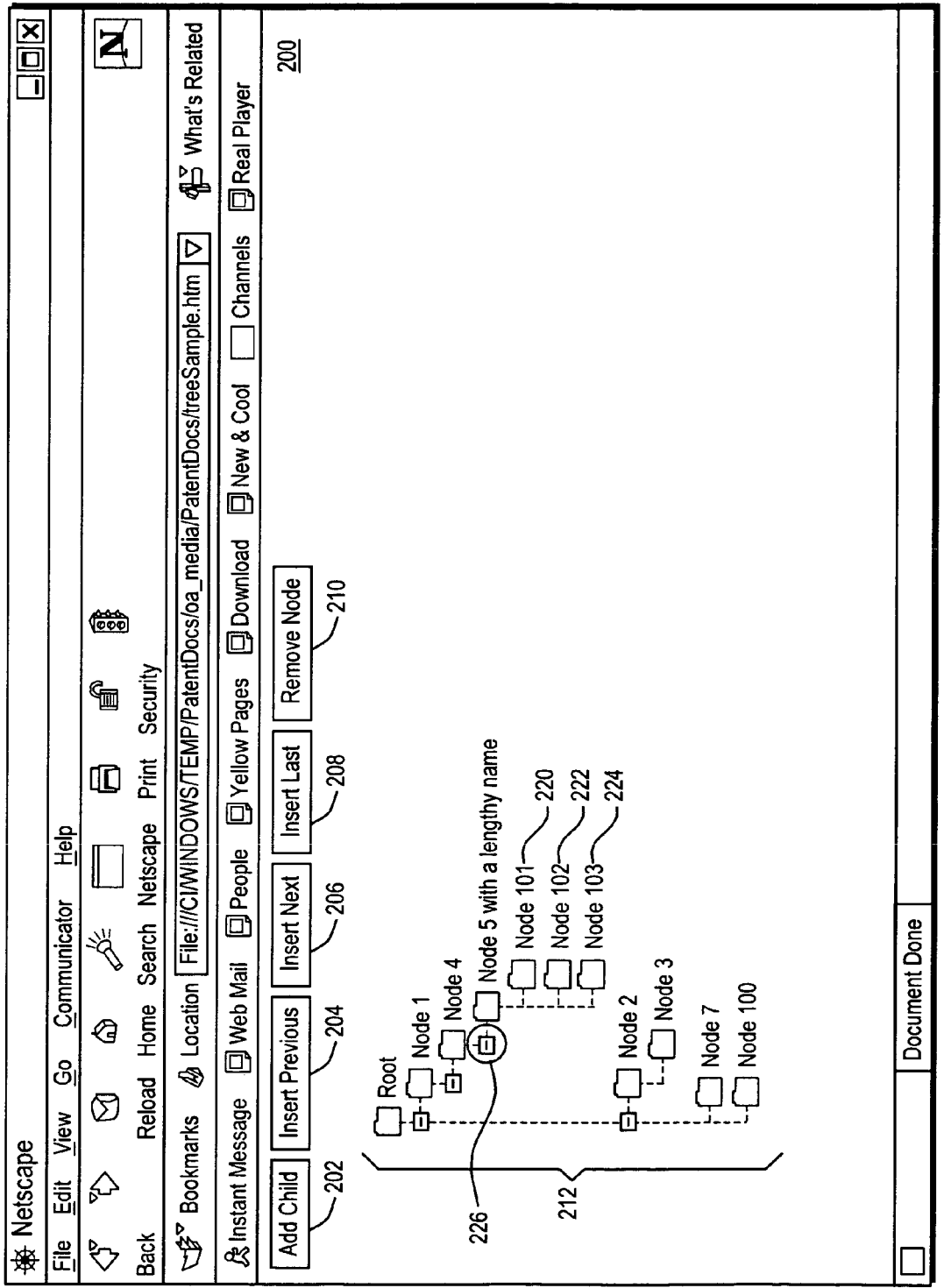

FIG. 7G is an illustration of the screen 200 of FIG. 7A showing that clicking on the "Remove Node" HTML Button 210 removes the selected node 218, in this case, Node 6.

Thus, Node 6 has been deleted from the tree. If Node 6 had had lower-level subnodes, they also would have been removed.

Note also in FIG. 7G that collapser 226 is in the "−" state, indicating that the associated node is expanded.

Figure 7H:
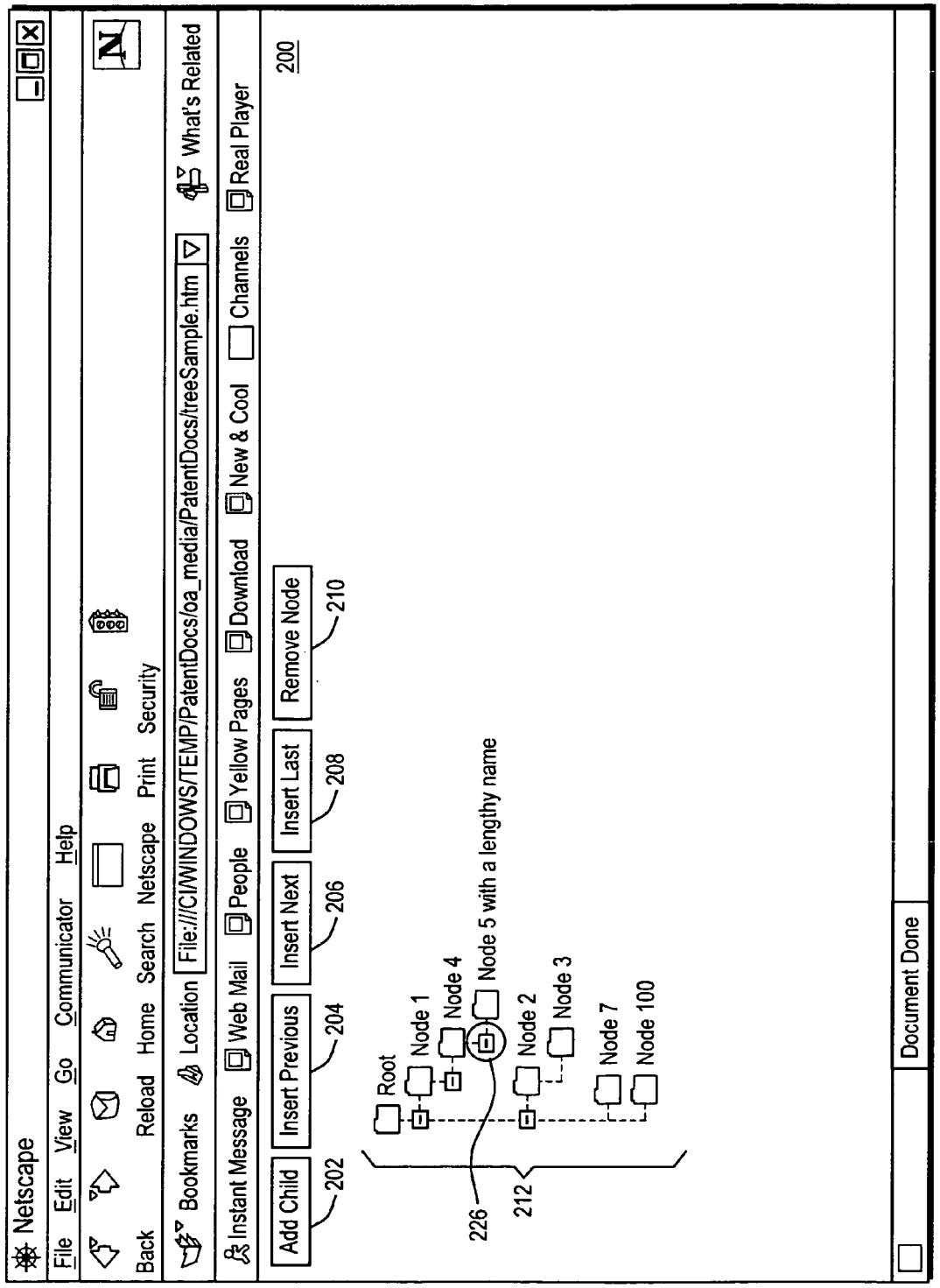

FIG. 7H illustrates the tree control 212 after the collapser 226 has been clicked on by a user. Note that the collapser 226 is now in the "+" state, and that the nodes 220, 222, 224 which are a level below node 5 are no longer visible. Of course, clicking on the collapser 226 again would expand the node out as in FIG. 7G.

Figure 8:
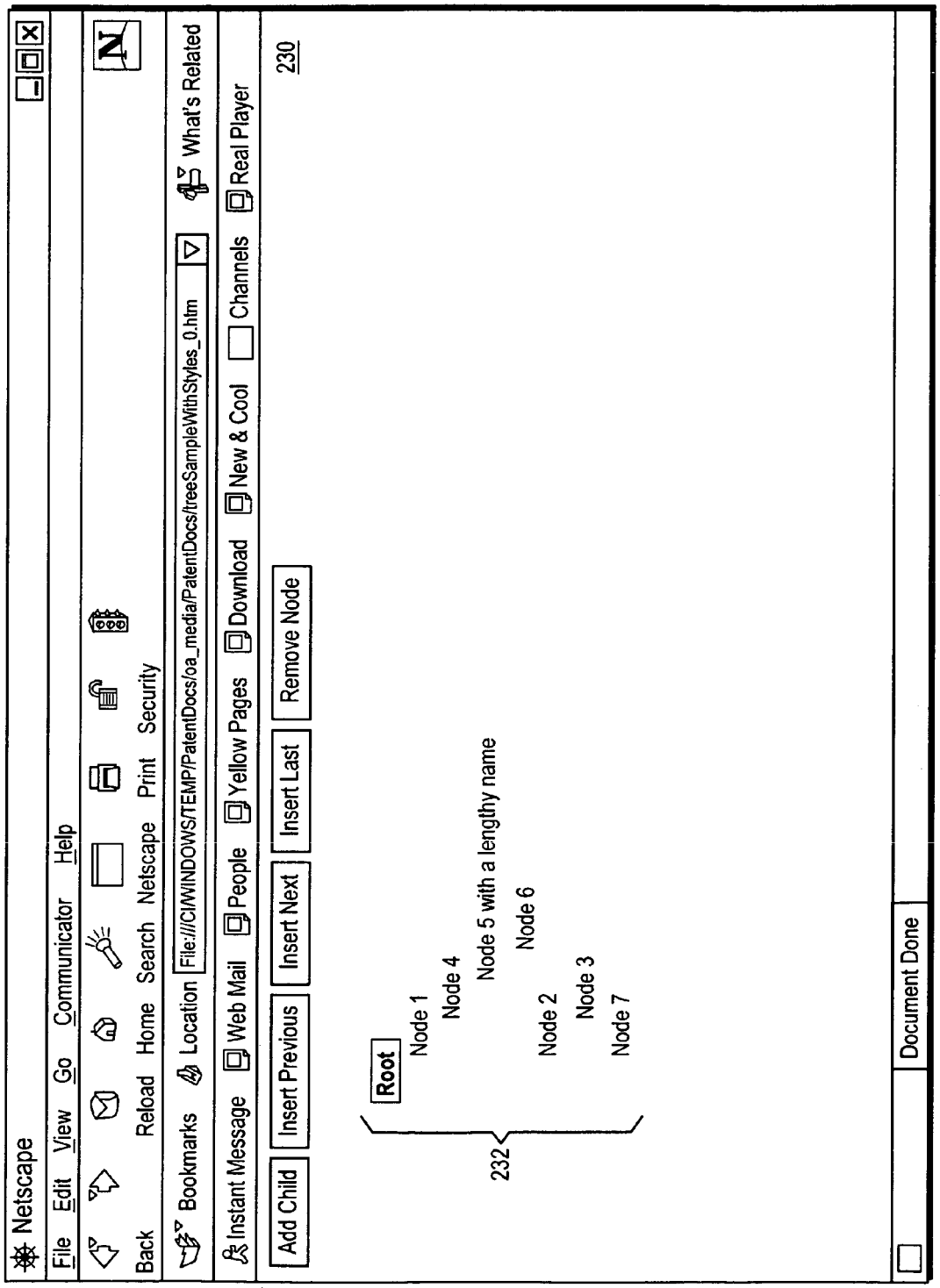
FIG. 8 is a screen shot of a tree control of the present invention with the tree style set to STYLE_NONE.

FIG. 8 is a screen shot 230 of a tree control 232 with the tree style set to STYLE_NONE. Note that the nodes of this tree do not have lines, collapsers or folder icons. The heirarchy is shown with indentation.

Figure 9:
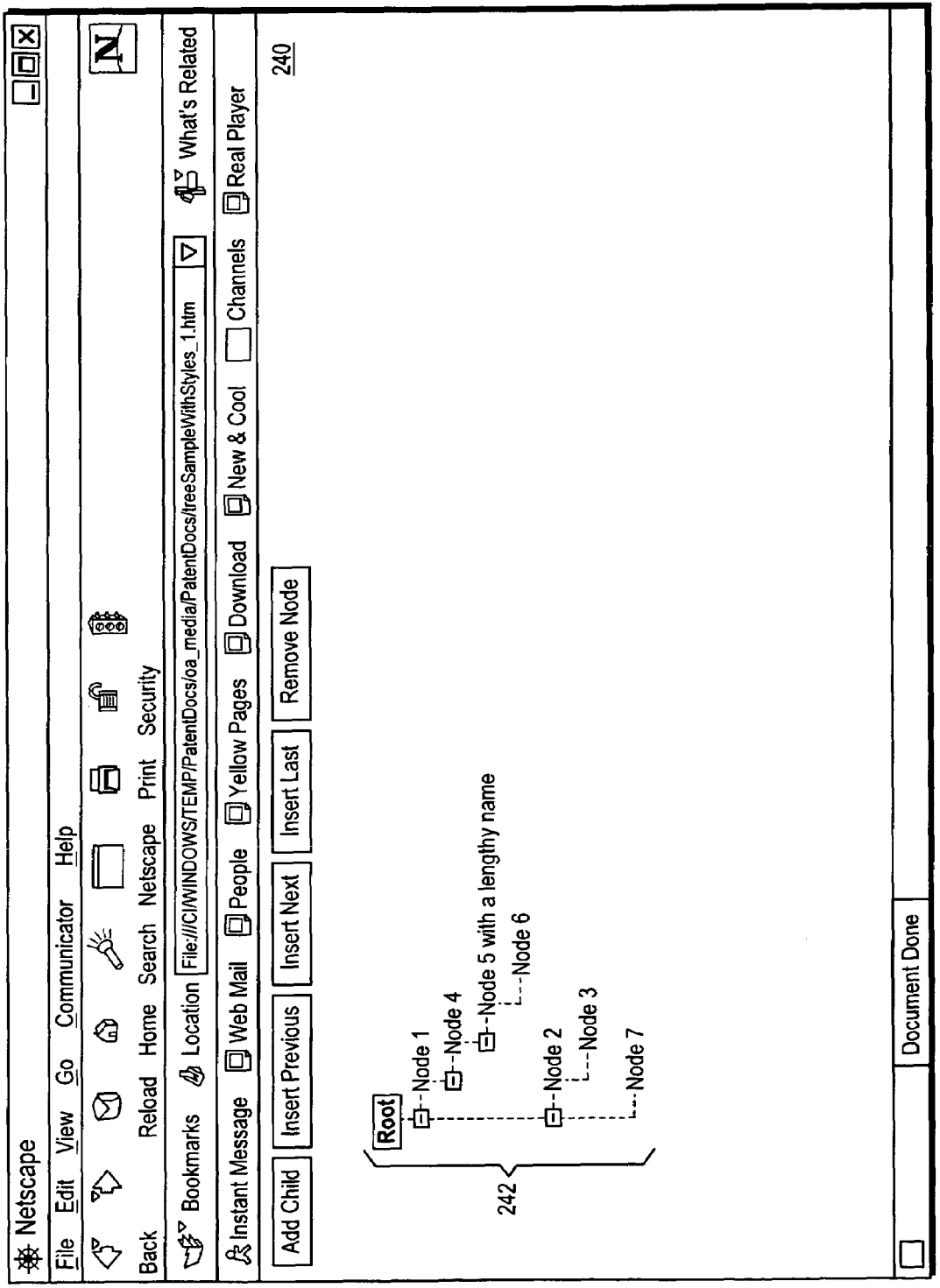
FIG. 9 is a screen shot of a tree control of the present invention with the tree style set to STYLE_TREE_LINES_ONLY.

FIG. 9 is a screen shot 240 of a tree control 242 with the tree style set to STYLE_TREE_LINES_ONLY. The nodes in this tree have lines and collapsers but no folder icons.

Figure 10:
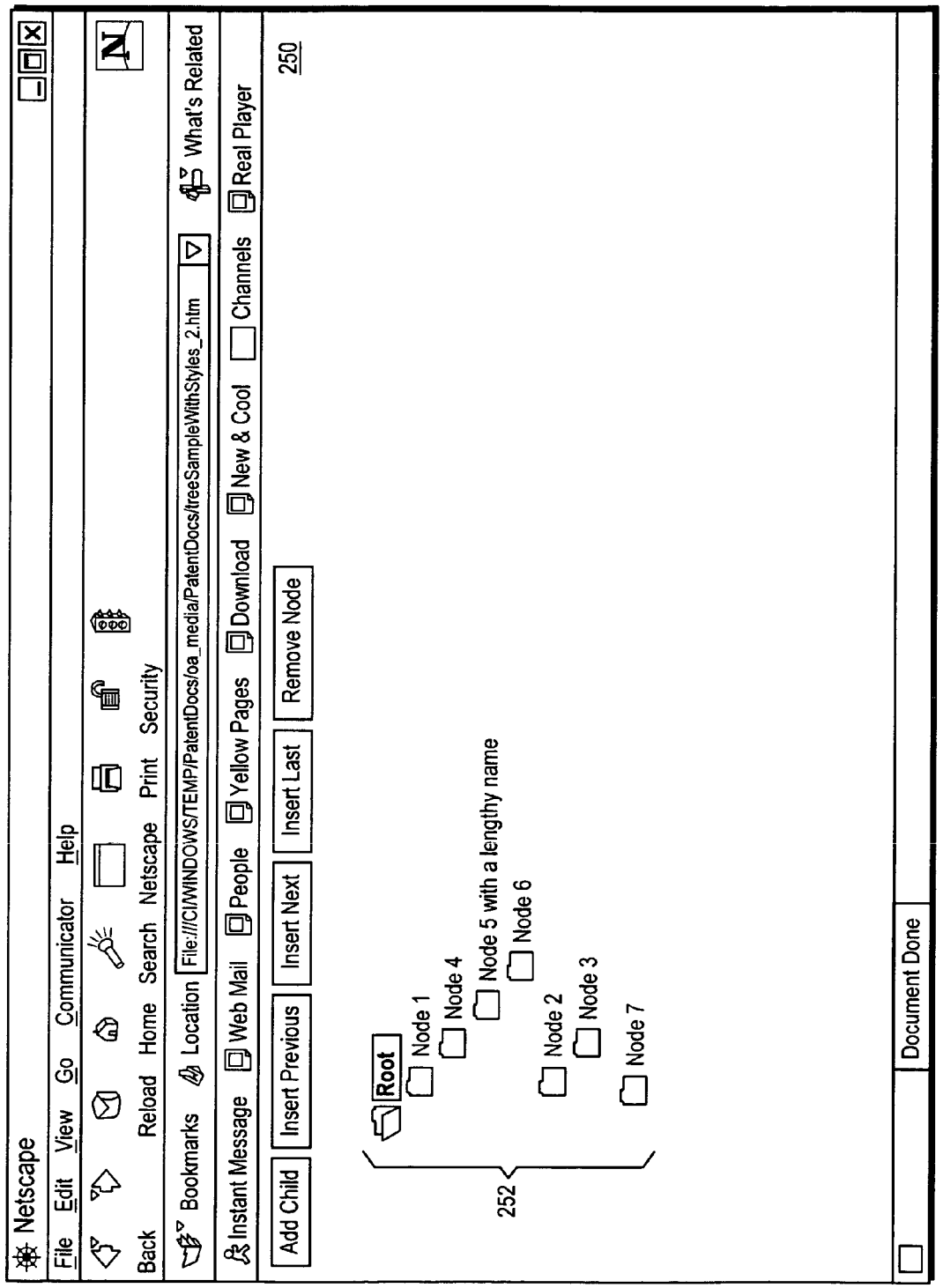
FIG. 10 is a screen shot of a tree control of the present invention with the tree style set to STYLE_ICONS_ONLY.

Conversely, FIG. 10 is a screen shot 250 of a tree control 252 with the tree style set to STYLE_ICONS_ONLY. The nodes in this tree have folder icons but no lines or collapsers. Each of the tree control variations of FIGS. 7–10 might be useful in particular applications, and it is up to the server provider to decide which style to use.

Figure 11A:
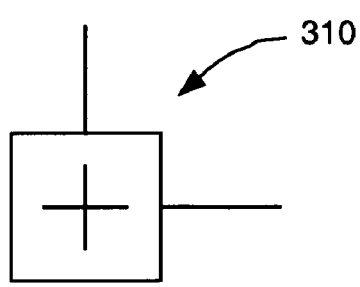
FIGS. 11A and 11B are illustrations of two picture files which include the expander icon.
Figure 11B:
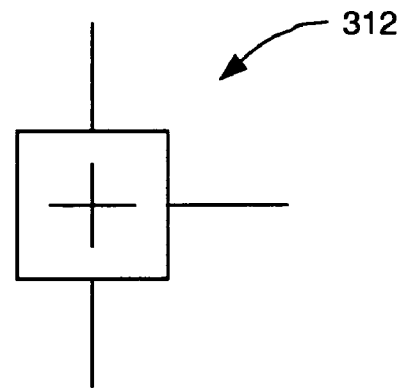

FIGS. 11A and 11B are illustrations of two picture files which include the expander icon. FIG. 11A shows an end "+" collapser 310 saved in a czPLNode.gif picture file, to be used for a last node within a tree branch. FIG. 11B shows a tee "+" collapser 312 saved in a czPNode.gif picture file.

Figure 12A:
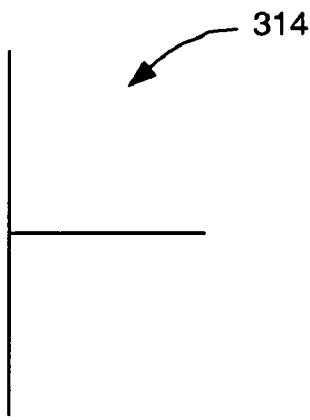
FIGS. 12A and 12B are illustrations of two line picture files.
Figure 12B:
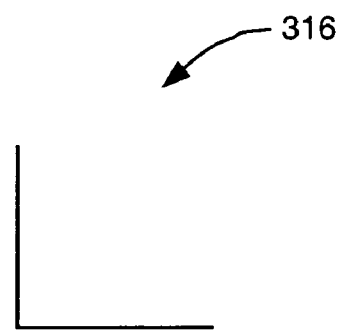

FIGS. 12A and 12B are illustrations of two line picture files. FIG. 12A shows a tee junction 314 saved in a czTNode.gif picture file. FIG. 12B shows a line 316, saved in a czLNode.gif file, to be used for a last node in a tree branch.

Figure 13A:
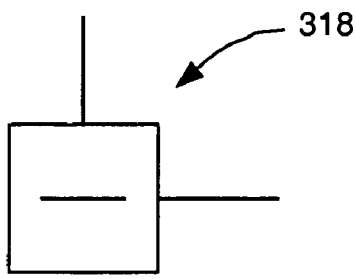
FIGS. 13A and 13B are illustrations of two picture files which include the collapser icon.
Figure 13B:
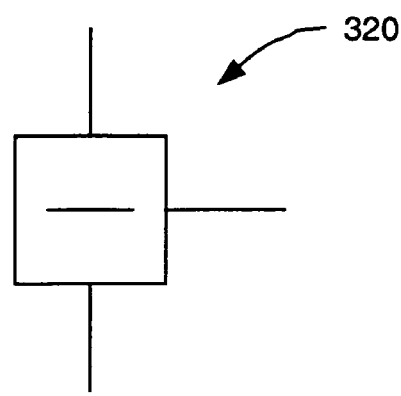

FIGS. 13A and 13B are illustrations of two picture files which include the collapser icon. FIG. 13A shows an end "−" collapser 318 saved in a czMLNode.gif picture file to be used in a last node of a tree branch. FIG. 11B shows a tee "−" collapser 320 saved in a czMNode.gif picture file.

Figure 14A:
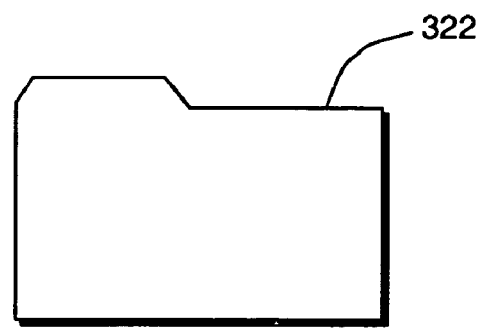
FIGS. 14A and 14B are illustrations of folder icons used to represent two different states.
Figure 14B:
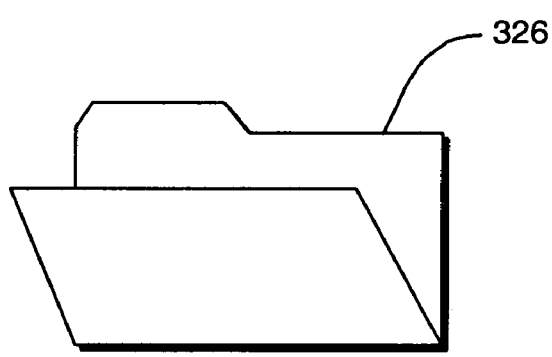

FIGS. 14A and 14B are illustrations of folder icons used to represent two different states. FIG. 14A shows a closed folder icon 322. FIG. 14B shows an open folder icon 326.

Figure 14C:
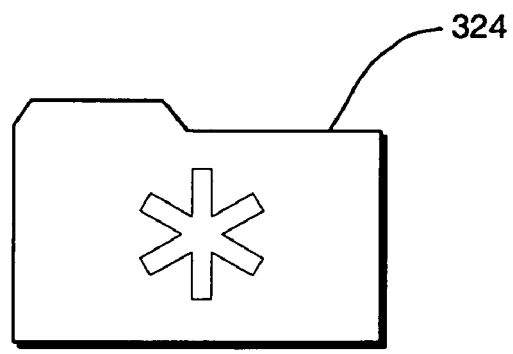
FIG. 14C is an illustration of another folder icon used in an embodiment of the present invention in which each node can be in one of four states.

FIG. 14C is an illustration of another folder icon 324 used in an embodiment of the present invention in which each node can be in one of four states. For example, in a hardware or software configuration application, each node of the tree control may represent a hardware component or software module. The folder icons 322, 326 of FIGS. 14A and 14B respectively indicate unselected items, while the icon 324 of FIG. 14C, which is a closed folder with an asterisk on its face indicates items which are selected. A fourth icon, not shown, is of an open folder with an asterisk. Alternatively, icons with an asterisk can indicate those areas where a user has not yet made a selection.

Figure 15:
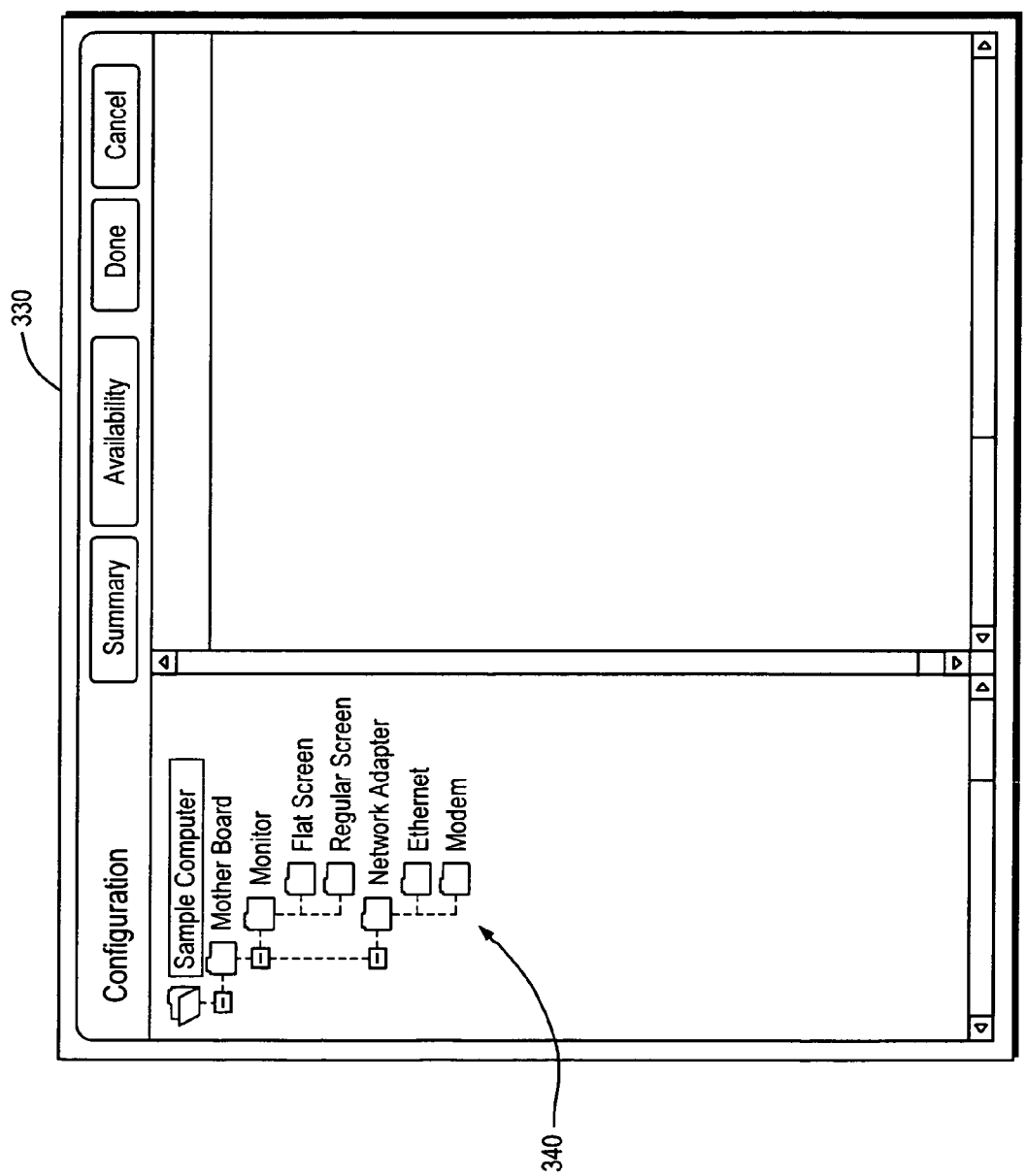
FIG. 15 is a screen shot of an application using an embodiment of the present invention in which a node may be in one of four states.

FIG. 15 is a screen shot 330 of an application in which a node maybe in one of four states. The tree control 340 has nodes which use the marked icon of FIG. 14C, as well as unmarked icon of FIG. 14A One skilled in the art would recognize that other markings, or altogether different icons, could similarly be used to denote special conditions.

Model View Controller

Model view controller (MVC) is a design pattern that is used in many of the applications. In a nutshell, MVC provides a convenient way of viewing a large amount of model data a little at a time. For example, assume there is a list of 100 values and it is desirable to show just ten lines to the user at any time. MVC provides a window to the model which displays only ten items in the user interface control. As the user scrolls through the data, the MVC iterates through the model by fetching and displaying ten data at a time.

In a tree control embodiment of the present invention, all of the data are rendered as individual tree nodes. When the number of nodes increases, the tree control will require more graphical resources from the system. To avoid this, and to reduce the amount of memory required, an MVC pattern can be implemented on the tree control so that the tree control scans the model to render the nodes a few at a time.

Thus, using the MVC pattern, all of the data required to render a tree node is held in a model object collection. A tree control asks the model for data to render. In this way, several hundred nodes can be cached in the model while the view displays only a few of them.

For a huge Bill of Material BOM structure the above MVC pattern will reduce the number of round trips for fetching more data.

Equivalents

While this invention has been particularly shown and described with references to particular embodiments thereof, it will be understood by those skilled in the art that various changes in form and details may be made therein without departing from the scope of the invention encompassed by the appended claims. For example, a browser is capable of retrieving and displaying any file stored on a computer if the file is in a browser readable, e.g., HTML, format. Thus, while it is common to request a page from a Web server, it is not necessary. The term server can include any mechanism for providing a "Web" page, such as a Web server, a file server, an email server or sender, an operating system, or even a peer client computer that is capable of sending such a page.

What is claimed is:

1. A computer program product having computer program code embodying computer program instructions encoded on a computer readable medium for performing a dynamic tree control system operable for rendering the dynamic tree on a visual display device, comprising:
   data stored on a server and accessible through a client browser;
   a scripted program sent from the server, the program to be interpreted by a client browser, comprising:
   program code for displaying, under control of the browser, a tree structure, the tree structure comprising at least one tree node in which at least a portion of data accessible from the server is represented;
   program code for dynamically altering the tree structure without further accessing the server, responsive to an event; and
   an event manager comprising:
      program code for registering with the browser to be notified upon occurrence of the event, notification further comprising at least one listener operable to receive the notification at registered layers;
      program code for receiving notification of the event from the browser, and
      program code for notifying a layer in which the event originated; and
      program code in a notified layer for responding to the event, said program code for responding including said program code for dynamically altering the tree structure, the scripted program further comprising:
      a listener comprising:
         program code for registering a layer to listen for a specified event,
         program code for receiving notification of an event, and
         program code for notifying layers which have registered for the event.

2. The dynamic tree control system of claim 1, wherein the program code for altering the tree structure comprises:
   program code for adding at least one new tree node.

3. The dynamic tree control system of claim 1, wherein the program code for altering the tree structure comprises:
   program code for deleting at least one tree node.

4. The dynamic tree control system of claim 1, wherein the program code for altering the tree structure comprises:
   program code for modifying the data with which the node is associated.

5. The dynamic tree control system of claim 1, wherein the program code for altering the tree structure comprises:
   program code for modifying the appearance of the node.

6. The dynamic tree control system of claim 1, wherein a node comprises any of the group of an icon, a collapser and a label.

7. The dynamic tree control system of claim 6, wherein the icon is one of a plural folder icons, each folder icon representing a node status.

8. The dynamic tree control system of claim 6, wherein the program code for altering the tree structure comprises:
   program code for expanding a collapsed node when the node's collapser is clicked by a user;
   program code for collapsing an expanded node when the node's collapser is clicked by the user; and program code for alternating a collapser's state responsive to the collapsed/expanded state of the collapser's corresponding node.

9. The method of claim 8 further comprising: selectively modifying a tree node of the displayed tree structure in response to the event;
invoking, in response to the event, scripted instructions operable for dynamic interpretation by the rendering browser, the scripted instructions operable for modifying at least one tree node on a layer in the rendering device.

10. The method of claim 9 wherein the scripted instructions affect only a singly layer, the changes to the node-link structure performed by redrawing only the layer including the changed tree nodes.

11. The method of claim 10 wherein the script corresponds to a layer responsive to the invoked script for rendering the tree node, Invoking the script further comprises invoking a style sheet operable to modify the layer corresponding to the node for modification.

12. The method of claim 11 wherein the event triggers a responsive node action affecting the layer to which the node corresponds, each node corresponding to a particular layer and each action affecting at least one tree node.

13. The dynamic tree control system of claim 1, wherein the script is written in Javascript.

14. The dynamic tree control system of claim 1, wherein the scripted program and the data are sent by the server using HTTP and HTML.

15. The dynamic tree control system of claim 1, further comprising:
tree class program code for representing the tree in a tree structure and for displaying the tree in a tree layer responsive to the tree structure; and
tree node class program code for representing a plurality of tree nodes in corresponding tree node structures and for displaying the tree nodes in respective tree node layers, the tree structure having references to the tree node structures, the tree layer containing the tree node layers, at least one tree node structure being associated with data retrieved from the server.

16. The dynamic tree control system of claim 15, wherein a tree node layer comprises:
a collapser layer;
an icon layer; and
a label layer.

17. The dynamic tree control system of claim 15, further comprising:
program code for generating a style sheet for a layer, responsive to the layer's depth within the tree structure.

18. The dynamic tree control system of claim 15, further comprising: program code for rendering <DIV> tags, responsive to the tree structure.

19. The method of claim 15 wherein the tree nodes correspond to a layer, further comprising:
detecting an event by a registered listening layer, the registered listening layer corresponding to a tree node and operable to invoke a node action in response to detecting the event.

20. The dynamic tree control system of claim 1, wherein upon a specified event, additional data is retrieved from the server.

21. The dynamic tree control system of claim 1, wherein the tree structure represents a bill of material.

22. The dynamic tree control system of claim 1, wherein the tree structure represents an organization structure.

23. The dynamic tree control system of claim 1, wherein the server is a Web server.

24. The dynamic tree control system of claim 1, wherein the server is a file server.

25. The dynamic tree control system of claim 1, wherein the program uses a dynamic markup language.

26. A computer-implemented method of dynamic tree control, comprising:
a client browser for accessing data stored on a server;
a script program sent from a server for:
displaying, under control of the browser, a tree structure, the tree structure comprising at least one tree node in which at least a portion of data accessible from the server is represented;
dynamically altering the tree structure without further accessing the server, responsive to an event; and
managing events, further comprising:
registering with the browser to be notified upon occurrence of the event, the registered events responsive to a scripted seguence of instructions;
receiving notification of the event from the browser, notification further comprising at least one listener operable to receive the notification at registered layers;
notifying a layer in which the event originated: and
responding to the event from the notified layer, responding including dynamically altering the tree structure, the altering operable to avoid downloading executable code or entire pages from the server, receiving the notification of the event including listening for the registered event further comprising;
registering a layer to listen for a specified event;
receiving notification of an event; and
notifying layers which have registered for the event.

27. The method of claim 26, wherein the scripted program further comprises:
an event manger for:
registering with the browser to be notified upon occurrence of the event,
receiving notification of the event from the browser, and notifying a layer in which the event originated; and
program code in a notified layer for responding to the event, said program code for responding including said program code for dynamically altering the tree structure.

28. The method of claim 26, wherein the script program further comprises a listener for:
registering a layer to listen for a specified event,
receiving notification of an event, and
program code for notifying layers which have registered for the event.

29. The method of claim 26, wherein altering the tree structure comprises adding at least one new tree node.

30. The method of claim 26, wherein altering the tree structure comprises deleting at least one tree node.

31. The method of claim 26, wherein altering the tree structure comprises modifying the data with which the node is associated.

32. The method of claim 26, wherein altering the tree structure comprises modifying the appearance of the node.

33. The method of claim 26, wherein the node comprises any of the group of an icon, a collapser and a label.

34. The method of claim 33, wherein the icon is one of a plural folder icons, each folder icon representing a node status.

35. the method of claim 33, wherein altering the tree structure comprises:
  expanding a collapsed node when the node's collapser is selected by a user;
  collapsing an expanded node when the node's collapser is selected by the user; and
  alternating a collapser's state responsive to the collapsed or expanded state of the collapser's corresponding node.

36. The method of claim 26, further comprising:
  using tree class program code for representing the tree in a tree structure and for displaying the tree in a tree layer responsive to the tree structure; and
  using tree node class program code for representing a plurality of tree nodes in corresponding tree node structures and for displaying the tree nodes in respective tree node layers, the tree structure having references to the tree node structures, the tree layer containing the tree node layers, at least one tree node structuring being associated with data retrieved from the server.

37. The method of claim 36, wherein a tree node layer comprises:
  a collapser layer;
  an icon layer; and
  a label layer.

38. The method of claim 36, further comprising generating a style sheet for a layer, responsive to the layer's depth within the tree structure.

39. The method of claim 36, further comprising rendering <DIV> tags, responsive to the tree structure.

40. The method of claim 36, wherein upon a specified event, retrieving additional data from the server.

41. The method of claim 26, wherein the tree structure represents a bill of material.

42. The method of claim 26, wherein the tree structure represents an organization structure.

43. The method of claim 26 wherein the tree nodes correspond to a layer, further comprising:
  detecting an event by a registered listening layer, the registered listening layer corresponding to a tree node and operable to invoke a node action in response to detecting the event;
  selectively modifying a tree node of the displayed tree structure in response to the event, wherein the event triggers a responsive node action affecting the layer to which the node corresponds, each node corresponding to a particular layer and each action affecting at least one tree node.

44. The method of claim 43 wherein the scripted instructions are operable for dynamic interpretation by the rendering browser, the scripted instructions further operable for modifying at least one tree node on a layer in the rendering device, wherein the scripted instructions affect only a singly layer, the changes to the node-link structure performed by redrawing only the layer including the changed nodes.

45. An article of manufacture, comprising:
  a machine-readable medium; and
  a scripted program for a dynamic tree control system on the medium, the program sent from the server, the program to be interpreted by a client browser having access to data stored on the server, comprising:
    program code for displaying, under control of the browser, a tree structure, the tree structure comprising at least one tree node in which at least a portion of data accessible from the server is represented;
    program code for dynamically altering the tree structure without further accessing the server, responsive to an event; and
    an event manager comprising:
      program code for registering with the browser to be notified upon occurrence of the event, the registered events responsive to a scripted sequence of instructions;
      program code for receiving notification of the event from the browser, notification further comprising at least one listener operable to receive the notification at registered layers;
      program code for notifying a layer in which the event originated; and
      program code in a notified layer for responding to the event, said program code for responding including said program code for dynamically altering the tree structure, the altering operable to avoid downloading executable code or entire pages from the server, the scripted program further comprising:
        a listener comprising:
          program code for registering a layer to listen for a specified event;
          program code for receiving notification of an event; and program code for notifying layers which have registered for the event.

46. A dynamic tree control system, comprising:
  data stored on a server and accessible through a client browser;
  a scripted program sent from the server, the program to be interpreted by a client browser, comprising:
  program code for displaying, under control of the browser, a tree structure, the tree structure comprising at least one tree node in which at least a portion of data accessible from the server is represented; and
  program code for dynamically altering the tree structure without further accessing the server, responsive to an event; and
  an event manager comprising:
    program code for registering with the browser to be notified upon occurrence of the event, the registered events responsive to a scripted sequence of instructions;
    program code for receiving a notification of the event from the browser;
    program code for notifying a layer in which the event originated, notification further comprising at least one listener operable to receive the notification at registered layers; and
    program code in a notified layer for responding to the event, said program code for responding including said program code for dynamically altering the tree structure, the altering operable to avoid downloading executable code or entire pages from the server, the scripted program further comprising:
      a listener comprising:
        program code for registering a layer to listen for a specified event;
        program code for receiving notification of an event; and
        program code for notifying layers which have registered for the event.

* * * * *